US012692847B2

(12) United States Patent
Howarth et al.

(10) Patent No.: US 12,692,847 B2
(45) Date of Patent: Jul. 28, 2026

(54) ACTUATORS

(71) Applicant: CAMBRIDGE MECHATRONICS LIMITED, Cambridge (GB)

(72) Inventors: James Howarth, Cambridge (GB); Matthew Reynolds, Cambridge (GB); Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 371 days.

(21) Appl. No.: 18/269,535

(22) PCT Filed: Dec. 24, 2021

(86) PCT No.: PCT/GB2021/053436
§ 371 (c)(1),
(2) Date: Jun. 23, 2023

(87) PCT Pub. No.: WO2022/144541
PCT Pub. Date: Jul. 7, 2022

(65) Prior Publication Data
US 2024/0318641 A1 Sep. 26, 2024

(30) Foreign Application Priority Data
Dec. 30, 2020 (GB) ...................................... 2020741

(51) Int. Cl.
*F03G 7/06* (2006.01)
*G03B 5/04* (2021.01)
*G03B 13/36* (2021.01)

(52) U.S. Cl.
CPC ....... *F03G 7/06143* (2021.08); *F03G 7/0665* (2021.08); *G03B 5/04* (2013.01);
(Continued)

(58) Field of Classification Search
CPC ..... F03G 7/06143; F03G 7/0665; G03B 5/04; G03B 13/36; G03B 2205/0076
See application file for complete search history.

(56) References Cited

U.S. PATENT DOCUMENTS

2007/0280668 A1 12/2007 Kubo et al.
2013/0227943 A1 9/2013 Mance et al.
(Continued)

FOREIGN PATENT DOCUMENTS

JP 63-021367 A 1/1988
WO 2010/089526 A2 8/2010
(Continued)

OTHER PUBLICATIONS

Great Britain Office Action received for GB Application No. 2020741. 1, mailed on Oct. 24, 2022, 4 pages.
(Continued)

*Primary Examiner* — Minh Q Phan
(74) *Attorney, Agent, or Firm* — Van Hoven PC; Stefan D. Osterbur; Joshua Van Hoven Van Hoven

(57) ABSTRACT

A shape memory alloy actuator (1) includes a first part (2), a second part (3), one or more heat sinks (2, 3, 35, 52), and one or more shape memory alloy wires (4, 5). The one or more shape memory alloy wires (4, 5) include a first segment of shape memory alloy wire (4). The one or more shape memory alloy wires (4, 5) are configured to move the second part (3) relative to the first part (2) over a range of movement. The first segment (4) of shape memory alloy wire is connected to the first part (2) by a first resilient element (7) at a first end (6), and a second end (8) of the first segment of shape memory alloy wire (4) is connected to the second part (3). The first resilient element (7) is configured such that in response to a change in tension of the first segment of shape memory alloy wire (4), a first distance (d, $d_1$) between the first segment of shape memory alloy wire
(Continued)

(4) and at least one of the heat sinks (2, 3, 35, N 52) is increased or decreased by an amount greater than a change in a second distance (I, I$_l$) between the first and second ends (6, 8).

11 Claims, 15 Drawing Sheets

(52) U.S. Cl.
CPC ...... *G03B 13/36* (2013.01); *G03B 2205/0053* (2013.01); *G03B 2205/0076* (2013.01)

(56)                References Cited

U.S. PATENT DOCUMENTS

2019/0129132  A1      5/2019  Fan et al.
2024/0376873  A1*  11/2024  Carr ....................... G03B 13/36

FOREIGN PATENT DOCUMENTS

WO        2012/013180  A2      2/2012
WO        2017/055788  A1      4/2017
WO        2022/084699  A1      4/2022

OTHER PUBLICATIONS

International Search Report and Written Opinion received for PCT Patent Application No. PCT/GB2021/053436, mailed on Mar. 9, 2022, 10 pages.

* cited by examiner

ACTUATORS

CROSS-REFERENCE TO RELATED APPLICATIONS

This application is a national stage application under 35 U.S.C. § 371 of International Application No. PCT/GB2021/053436, filed Dec. 24, 2021, which claims priority of GB Patent Application 2020741.1, filed Dec. 30, 2020, the disclosures of each of which are hereby incorporated by reference herein in their entireties.

FIELD

The present application relates to actuators, particularly actuators including one or more shape-memory alloy (SMA) wires.

BACKGROUND

An actuator including one or more shape-memory alloy (SMA) wires may be used, for example, in a camera to move a lens assembly in directions perpendicular to the optical axis so as to provide optical image stabilization (OIS). Shape-memory alloy wires operate based on, for example, transforming to an austenitic phase upon heating and reverting to a martensitic phase on cooling.

WO 2019/086855 A1 describes a camera with an actuator assembly including a support platform, a moving platform that supports a lens assembly, SMA wires connected to the support platform and the moving platform, bearings to bear the moving platform on the support platform, and two arms extending between the support platform and the moving platform.

SUMMARY

According to a first aspect of the present invention, there is provided a shape memory alloy actuator including a first part, a second part, one or more heat sinks, and one or more shape memory alloy wires. The one or more shape memory alloy wires include a first segment of shape memory alloy wire. The one or more shape memory alloy wires are configured to move the second part relative to the first part over a range of movement. The first segment of shape memory alloy wire is connected to the first part by a first resilient element at a first end, and a second end of the first segment of shape memory alloy wire is connected to the second part. The first resilient element is configured such that in response to a change in tension of the first segment of shape memory alloy wire, a first distance between the first segment of shape memory alloy wire and at least one of the heat sinks is increased or decreased by an amount greater than a change in a second distance between the first and second ends.

The one or more shape memory alloy wires may be configured to move the second part relative to the first part over the range of movement and/or move the first part relative to the second part over the range of movement.

The first distance may be an average distance of the first segment of shape memory alloy wire from the at least one heat sink.

In response to a change in tension of the first segment of shape memory alloy wire, the first end may be moved by a first displacement towards the second end, and a second displacement perpendicular to the first displacement. The second displacement may be greater than the first displacement. The first displacement may correspond to a direction parallel to the first segment of shape memory alloy wire before the change in tension. The second displacement may correspond to a direction perpendicular to the first segment of shape memory alloy wire before the change in tension.

The first resilient element may include a portion extending in a direction oriented at an angle of less than or equal to 45 degrees to the second distance. When the first segment of shape memory alloy wire is only just taut, the first resilient element may include a portion extending in a direction oriented at an angle of less than or equal to 45 degrees to the first segment of shape memory alloy wire. The first resilient element may have a resistance to bending against forces applied in a direction corresponding to the first distance which is less than in a direction corresponding to the second distance. The first resilient element may include, or take the form of, a spring. The first resilient element may include, or take the form of, a leaf spring.

The second end of the first segment of shape memory alloy wire may be connected to the second part by a second resilient element.

The second resilient element may be configured such that in response to a change in tension of the first segment of shape memory alloy wire, the second end may be moved by a third displacement towards the first end, and a fourth displacement perpendicular to the third displacement. The fourth displacement may be greater than the third displacement. The third displacement may correspond to a direction parallel to the first segment of shape memory alloy wire before the change in tension. The fourth displacement may correspond to a direction perpendicular to the first segment of shape memory alloy wire before the change in tension. The third displacement may be anti-parallel to the first displacement. The fourth displacement may be parallel or anti-parallel to the second displacement.

The second resilient element may include a portion extending in a direction which is oriented at an angle of less than or equal to 45 degrees with the second distance.

When the first segment of shape memory alloy wire is only just taut, the second resilient element may include a portion extending in a direction oriented at an angle of less than or equal to 45 degrees to the first segment of shape memory alloy wire. The second resilient element may have a resistance to bending against forces applied in a direction corresponding to the first distance which is less than in a direction corresponding to the second distance. The second resilient element may include, or take the form of, a spring. The second resilient element may include, or take the form of, a leaf spring.

The first segment of shape memory alloy wire may be attached to the first and/or second resilient elements by crimping. The first segment of shape memory alloy wire may be attached to the first and/or second resilient elements by laser welding.

For a given change in tension of the first segment of shape memory alloy wire, the change in the first distance may be greater than or equal to ten times the change in the second distance.

A change in the first distance may correspond to movement away from a first heat sink of the one or more heat sinks and towards a second heat sink of the one or more heat sinks.

A change in the first distance corresponding to movement towards a heat sink may result in a decreased average distance of the first segment of shape memory alloy wire from that heat sink. A change in the first distance corresponding to movement away from a heat sink may result in an increased average distance of the first segment of shape memory alloy wire from that heat sink.

The first part may include, or support, at least one of the heat sinks. At least one of the one or more heat sinks may be mounted on the first part. At least one of the one or more heat sinks may be integrated with the first part. At least one of the one or more heat sinks may correspond to a portion of the first part.

The second part may include, or support, at least one of the heat sinks. At least one of the one or more heat sinks may be mounted on the second part. At least one of the one or more heat sinks may be integrated with the second part. At least one of the one or more heat sinks may correspond to a portion of the second part.

The one or more shape memory alloy wires may include one or more further segments of shape memory alloy wire, each further segment of shape memory alloy wire being identically configured to the first segment of shape memory alloy wire.

The one or more shape memory alloy wires may include the first segment of shape memory alloy wire and a second segment of shape memory alloy wire.

The second segment of shape memory alloy wire may be configured to oppose the first segment of shape memory alloy wire. Tension(s) of the first and second segments of shape memory alloy wire may be variable independently of the position of the second part over at least a portion of the range of movement.

The second segment of shape memory alloy wire may be configured to oppose the first segment of shape memory alloy wire when contraction of the first segment will cause extension of the second segment and vice-versa. The first segment of shape memory alloy wire may be opposed by the second segment of shape memory alloy wire and one or more further segments of shape memory alloy wire.

The shape memory alloy actuator may also include a third resilient element configured to oppose the first segment of shape memory alloy wire.

The third resilient element may be configured to oppose the first segment of shape memory alloy wire when contraction of the first segment of shape memory alloy wire causes deformation of the third resilient element which increases tension of the first segment of shape memory alloy wire. The first segment of shape memory alloy wire may be opposed by the third resilient element and one or more further resilient elements. The third resilient element may include, or take the form of, a spring. The third resilient element may include, or take the form of, a leaf spring or a helical spring. Each further resilient element may include, or take the form of, a spring. Each further resilient element may include, or take the form of, a leaf spring or a helical spring.

Apparatus may include the shape memory alloy actuator and a controller. The controller may be configured to control the relative positions of the first part and the second part. The controller may also be configured to control a cooling rate of the first segment of shape memory alloy wire by adjusting the tension of the first segment of shape memory alloy wire. Moving the first segment of shape memory alloy wire towards at least one of the heat sinks may increase the cooling rate. Moving the first segment of shape memory alloy wire away from at least one of the heat sinks may decrease the cooling rate.

Controlling a cooling rate of the first segment of shape memory alloy wire by adjusting the tension of the first segment of shape memory alloy wire may correspond to adjusting the tension(s) of first and second segments of shape memory alloy wire without changing the relative positions of the first and second parts. Moving the first segment of shape memory alloy wire towards at least one of the heat sinks may increase the cooling rate by increasing a heat flux from the first segment of shape memory alloy wire to that heat sink. Moving the first segment of shape memory alloy wire away from at least one of the heat sinks may decrease the cooling rate by decreasing a heat flux from the first segment of shape memory alloy wire to that heat sink.

The apparatus may also include a temperature sensing module configured to determine a temperature corresponding to the first segment of shape memory alloy wire. The controller may be configured to determine the temperature, and to adjust a distance of the first segment of shape memory alloy wire from at least one of the heat sinks based on the temperature.

The temperature may be a temperature of the first segment of shape memory alloy wire. The temperature may be a temperature of the shape memory alloy actuator. The temperature may be a temperature of the apparatus. The temperature may be an ambient temperature. The temperature sensing module may be provided by the controller. The temperature sensing module may be separate from the controller. The temperature sensing module may be configured to determine (or estimate or calculate) the temperature of the first segment of shape memory alloy wire based on a history of power supplied to the first segment of shape memory alloy wire and a measurement of an ambient temperature. The temperature sensing module may be configured to determine a temperature of the first segment of shape memory alloy wire based on a resistance of the first segment of shape memory alloy wire. The apparatus and/or the temperature sensing module may include one or more ambient temperature sensors. Adjusting a distance of the first segment of shape memory alloy wire from at least one of the heat sinks may include adjusting a mean average distance.

Adjusting the distance of the first segment of shape memory alloy wire from at least one of the heat sinks based on the temperature may include retrieving, from a look-up table stored by the controller, a pre-calibrated distance which corresponds to the temperature.

When the temperature lies between a pair of temperature values stored in the look-up table, retrieving a pre-calibrated distance may include interpolating a distance between a pair of pre-calibrated distances corresponding to the pair of stored temperature values.

Adjusting the distance of the first segment of shape memory alloy wire from at least one of the heat sinks based on the temperature may include, in response to determining an increase in the temperature, reducing the distance of the first segment of shape memory alloy wire from at least one of the heat sinks.

Adjusting the distance of the first segment of shape memory alloy wire from at least one of the heat sinks based on the temperature may include, in response to determining a decrease in the temperature, increasing the distance of the first segment of shape memory alloy wire from at least one of the heat sinks.

The controller may be further configured to reduce the distance of the first segment of shape memory alloy wire from at least one of the heat sinks before changing the relative positions of the second part and the first part.

The controller may be further configured to increase the distance of the first segment of shape memory alloy wire from at least one of the heat sinks after changing the relative positions of the second part and the first part. The controller may be further configured to adjust a distance of the first segment of shape memory alloy wire from at least one of the heat sinks based on relative position of the second part within the range of movement.

The controller may be configured to move the first segment of shape memory alloy wire closer to at least one of the heat sinks in response to the second part being within 20%, within 15%, within 10% or within 5% of a boundary of the range of motion. Percentage distances from the boundary of the range of motion may be calculated based on a distance from the boundary as a percentage of a width of the range of motion in the same direction. Percentage distances from the boundary of the range of motion may be calculated based on a distance from the boundary as a percentage of a maximum width of the range of motion in any direction.

Adjusting the distance of the first segment of shape memory alloy wire from at least one of the heat sinks based on relative position of the second part within the range of movement may include, in response to the second part moving closer to a centre of the range of movement, increasing the distance of the first segment of shape memory alloy wire from at least one of the heat sinks.

Adjusting the distance of the first segment of shape memory alloy wire from at least one of the heat sinks based on relative position of the second part within the range of movement may include, in response to the second part moving further from the centre of the range of movement, decreasing the distance of the first segment of shape memory alloy wire from at least one of the heat sinks.

The one or more shape memory alloy wires may include one or more further segments of shape memory alloy wire, each further segment of shape memory alloy wire being identically configured to the first segment of shape memory alloy wire, and wherein the controller is configured to control each further segment of shape memory alloy wire in the same way as the first segment of shape memory alloy wire.

An optical image stabilisation assembly for a camera may include the shape memory alloy actuator or the apparatus.

An auto-focus assembly for a camera may include the shape memory alloy actuator according or the apparatus.

According to a second aspect of the invention, there is provided a method of controlling a shape memory alloy actuator. The shape memory alloy actuator includes a first part, a second part, one or more heat sinks, and one or more shape memory alloy wires, including a first segment of shape memory alloy wire and a second segment of shape memory alloy wire configured to oppose the first segment of shape memory alloy wire. The one or more shape memory alloy wires are configured to move the second part relative to the first part over a range of movement. A tension of the first and second segments of shape memory alloy wire is variable independently of the position of the second part over at least a portion of the range of movement. The first segment of shape memory alloy wire is connected to the first part by a first resilient element at a first end and a second end of the first segment of shape memory alloy wire is connected to the second part. The first resilient element is configured such that in response to a change in tension of the first segment of shape memory alloy wire, a first distance between the first segment of shape memory alloy wire and at least one of the heat sinks is increased or decreased by an amount greater than a change in a second distance between the first and second ends. The method includes controlling a cooling rate of the first segment of shape memory alloy wire by adjusting the tension of the first segment of shape memory alloy wire. Moving the first segment of shape memory alloy wire towards at least one of the heat sinks increases the cooling rate. Moving the first segment of shape memory alloy wire away from at least one of the heat sinks decreases the cooling rate.

The one or more shape memory alloy wires may be configured to move the second part relative to the first part over the range of movement and/or move the first part relative to the second part over the range of movement.

Controlling a cooling rate of the first segment of shape memory alloy wire by adjusting the tension of the first segment of shape memory alloy wire may correspond to adjusting the tension(s) of first and second segments of shape memory alloy wire without changing the relative positions of the first and second parts.

The method may include features corresponding to any features of the shape memory alloy actuator and/or the apparatus.

The second end of the first segment of shape memory alloy wire may be connected to the second part by a second resilient element.

The method may also include determining, using a temperature sensing module, a temperature corresponding to the first segment of shape memory alloy wire.

The method may also include adjusting a distance of the first segment of shape memory alloy wire from at least one of the heat sinks based on the temperature.

Adjusting the distance of the first segment of shape memory alloy wire from at least one of the heat sinks based on the temperature may include retrieving, from a look-up table, a pre-calibrated distance of the first segment of shape memory alloy wire from at least one of the heat sinks which corresponds to the temperature.

Adjusting the distance of the first segment of shape memory alloy wire from at least one of the heat sinks based on the temperature may include, in response to determining an increase in the temperature, reducing the distance of the first segment of shape memory alloy wire from at least one of the heat sinks.

Adjusting the distance of the first segment of shape memory alloy wire from at least one of the heat sinks based on the temperature may include, in response to determining a decrease in the temperature, increasing the distance of the first segment of shape memory alloy wire from at least one of the heat sinks.

The method may also include, in response to changing the relative positions of the second part and the first part, reducing the distance of the first segment of shape memory alloy wire from at least one of the heat sinks.

The method may also include, in response to the relative positions of the second part and the first part are constant, increasing the distance of the first segment of shape memory alloy wire from at least one of the heat sinks.

The method may also include adjusting a distance of the first segment of shape memory alloy wire from at least one of the heat sinks based on a relative position of the second part within the range of movement.

Adjusting the distance of the first segment of shape memory alloy wire from at least one of the heat sinks based on relative position of the second part within the range of movement may include, in response to the second part moving closer to a centre of the range of movement, increasing the distance of the first segment of shape memory alloy wire from at least one of the heat sinks, and in response to the second part moving further from the centre of the range of movement, decreasing the distance of the first segment of shape memory alloy wire from at least one of the heat sinks.

The one or more shape memory alloy wires may include one or more further segments of shape memory alloy wire. Each further segment of shape memory alloy wire may be identically configured to the first segment of shape memory alloy wire. The method may also include controlling each further segment of shape memory alloy wire in the same way as the first segment of shape memory alloy wire.

BRIEF DESCRIPTION OF THE DRAWINGS

Certain embodiments of the present invention will now be described, by way of example only, with reference to the accompanying drawings, in which.

DETAILED DESCRIPTION

Heating rates for shape-memory alloy (SMA) wires may be readily controlled, for example by controlling a current I applied to a SMA wire to control resistive heating $I^2R$. By contrast, cooling rates depend on the environment of a SMA wire, and depend upon heat fluxes via radiation, convection and diffusion. The frequency response and transition times of SMA based actuators may be limited due to the cooling rate of the wires.

The examples of the present specification are based, at least in part, on the inventors' development of structures and methods which enable the cooling rates of a SMA wire to be increased by reducing the distance (or clearance) of that SMA wire from a structure or other heat sink which is at a lower temperature. For example, a suitable heat sink may be any part of the actuator structure which has the capacity to channel heat away from the SMA wire.

Whilst reducing the distance of a SMA wire from a heat sink may increase a heat flux from the SMA wire to the heat sink to allow faster cooling, this also has the consequence of increasing power consumption required to maintain the SMA wire at a desired temperature. Some of the examples described in the present specification may allow tension of one or more SMA wires to be controlled in order to actively influence cooling rates by controlling the separation (clearance) of the SMA wires from one or more heat sinks (which may simply correspond to parts of the actuator structure).

Examples according to the present specification include a resilient feature (for example a spring) which connects at least one end of a SMA wire to another part of the actuator and enables changes in SMA wire tension to move the SMA wire towards and/or away from nearby heat sinks.

Examples according to the present specification may enable reduction of transition times for SMA actuators without unduly increasing power consumption. Other effects and advantages of examples according to the present specification shall become apparent from the description hereinafter.

Figures 1A, 1B, 1C:
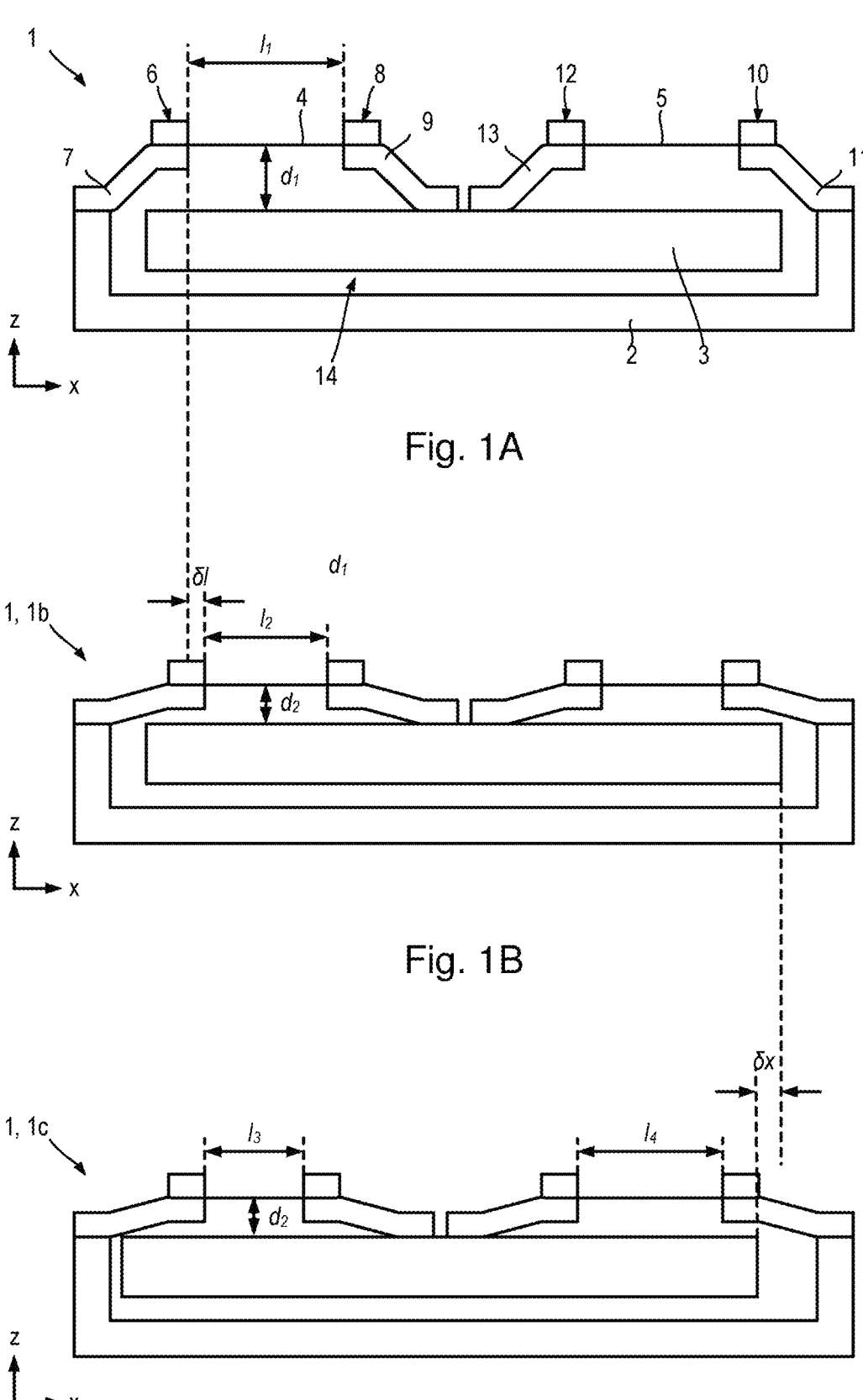
FIGS. 1A to 1C schematically illustrates a first SMA actuator.

Referring to FIG. 1A, a first shape-memory alloy (SMA) actuator 1 is shown.

The first SMA actuator 1 includes a first part 2 and a second part 3. The first and second parts 2, 3 are configured to be moveable relative to one another using one or more shape memory alloy wires, including at least a first segment of SMA wire 4. The SMA actuator 1 shown in FIG. 1A also includes a second segment of SMA wire 5, although other examples may only require the first segment of SMA wire 4 (see FIGS. 14A to 14C and 15). The first and second parts 2, 3 are moveable relative to one another across a range of motion. For example, if a linear SMA actuator 1 has a central position $x_0$, then the range of motion may extend for a distance $\Delta x$ (which may also be referred to as "stroke" $\Delta x$) to either side of the central position $x_0$.

The first and second segments of SMA wire 4, 5 may be made of any suitable SMA material, for example Nitinol or another titanium-alloy SMA material. The first and/or second parts 2, 3 may be formed of metal, for example stainless steel. The first and second parts 2, 3 may be formed in any suitable way, including without limitation machining, etching (e.g. laser or chemical etching), additive manufacturing and so forth. Some areas of the first and/or second parts 2, 3 may be coated with an electrically-insulating dielectric material in order to prevent short-circuits through the first and/or second parts 2, 3.

The first segment of SMA wire 4 is heated by applying a first current $I_1$ through the first segment of SMA wire 4. The first segment of SMA wire 4 has a resistance $R_1$, and for a total heat flux $J_1$ leaving the first segment of SMA wire 4, will change temperature until equilibrium is reached such that $I_1^2R_1 = J_1$. The equilibrium may be influenced by varying the first current $I_2$, and also by influencing the total heat flux $J_1$ as described hereinafter. As described hereinbefore, increasing the heating side of the equilibrium $I_1^2R_1$ is straightforward, whereas increasing the heat flux $J_1$ is significantly more complex. This latter form of control is the subject of this specification.

The second segment of SMA wire 5 is heated by applying a second current $I_2$ through the second segment of SMA wire 5, which may be varied independently of the first current $I_1$.

A first end 6 of the first segment of SMA wire 4 is connected to the first part 2 by a first resilient element 7. A second end 8 of the first segment of SMA wire 4 is connected to the second part 3, for example via a second resilient element 9 as shown in FIG. 1A. In other examples, the second end 8 may be connected to the second part 3 without the second resilient element 9 (see FIGS. 11A, 11B, 12, 13 and 15). The first segment of SMA wire 4 may be attached to the first and/or second resilient elements 7, 9 by crimps as illustrated in FIG. 1A. Alternatively, the first segment of SMA wire 4 may be attached to the first and/or second resilient elements 7, 9 by laser welding, or any other technique suitable to join the material forming the first segment of SMA wire 4 to the material(s) forming the first and second resilient elements 7, 9.

In the first SMA actuator 1 shown in FIG. 1A, a first end 10 of the second segment of SMA wire 5 is connected to the first part 2 via a third resilient element 11 and a second end 12 of the second segment of SMA wire 5 is connected to the second part 3 via a fourth resilient element 13. The second segment of SMA wire 5 is connected to the third and/or fourth resilient elements 11, 13 in the same way as the first segment of SMA wire 4 is attached to the first and/or second resilient elements 7, 9.

The first SMA actuator 1 includes a heat sink in the form of the second part 3. The second part 3 may function as a heat sink because it will typically have a greater thermal mass than the first and second segments of SMA wire 4, 5, and/or has sufficient thermal conductance to transfer heat away from the first and second segments of SMA wire 4, 5. For example, heat from the first and second segments of SMA wire 4, 5 may be transferred to the second part 3 by a combination of radiation, convention and conduction. Heat may then be spread through the second part and dissipated to the environment across a relatively larger area than that of the first and second segments of SMA wire 4, 5.

The first and second parts 2, 3 are held in physical contact with one another. For example, the first and second segments of SMA wire 4, 5 may be inclined so that a tension T in the first and second segments of SMA wire 4, 5 urges the first and second parts 2, 3 together. Alternatively, additional structures and/or resilient structure such as springs or armatures (not shown) may urge the first and second parts 2, 3 together. The overall effect is to allow relative movement of the first and second parts 2, 3 in a first direction x or on a plane defined by first x and second y directions, whilst restricting or preventing relative movements in a third direction z. A gap 14 between opposed surface of the first and second parts 2, 3 may include bearings such as, for example, one or more plain bearings (not shown), ball bearings (not shown) and so forth. There may be no gap 14 so that the first and second parts 2, 3 slide in direct contact.

Alternatively, the gap 14 may be empty and the first and second parts 2, 3 may be in contact via bearings (not shown) or other structures outside the plane illustrated in FIG. 1A (e.g. displaced in the second direction y). When included, the one or more bearings (not shown) may be made from a suitable metal or alloy such as phosphor bronze or stainless steel with a diamond-like carbon coating. Surfaces of the first and/or second parts 2, 3 which are in contact with a bearing or provide a surface for a bearing may also be coated with a coating (e.g. diamond-like carbon) to reduce wear.

FIG. 1A shows the first SMA actuator 1 in a central, or initial, configuration, for example corresponding to an actuator position $x_0$. In the central configuration, the first segment of SMA wire 4 has a length $l_1$, and is separated from the second part 3 by a distance $d_1$ (which may sometimes also be referred to as the clearance). In the central configuration $x_0$, the second segment of SMA wire 5 has the same length $l_1$ and is separated from the second part 3 by the same distance $d_1$. The distance $d_1$ may be an average distance of the first segment of SMA wire 4 from the heat sink in the form of the second part 3.

In the first SMA actuator 1, the second segment of SMA wire 5 is configured to oppose the first segment of SMA wire 4. The second segment of SMA wire 5 opposes the first segment of SMA wire 4 in the sense that contraction of the first segment of SMA wire 4 (movement in the negative x direction) will urge extension of the second segment of SMA wire 5 and vice versa. A consequence of this arrangement of opposing first and second segments of SMA wire 4, 5 is that a tension T in the first and second segments of SMA wire 4, 5 may be varied independently of the relative positions of the first and second parts 2, 3 over at least a portion of the range of movement $x_0 \pm \Delta x$. This functionality shall be explained further in relation to FIGS. 1B and 1C.

In other examples, the first segment of SMA wire 4 may be opposed by a resilient element such as a spring (see FIGS. 14A to 14C and 15), instead of the second segment of SMA wire 5.

Referring also to FIG. 1B, the first SMA actuator 1 is shown for a second configuration 1b in which the lengths of both first and second segments of SMA wire 4, 5 have been changed from $l_1$ to $l_2$, resulting in an increased tension T of the first and second segments of SMA wire 4, 5.

This change in tension T is achieved by changing the currents $I_1$, $I_2$ in order to shift the first and second segments of SMA wire 4, 5 to new equilibrium temperatures. The lengths change because a change in temperature of the first and second segments of SMA wire 4, 5 modifies the balance between austenitic and martensitic phases. Although the tension T has been increased, the relative positions of the first and second parts 2, 3 remain in the central configuration $x_0$.

The first resilient element 7 is configured such that in response to the change in tension T of the first segment of SMA wire 4, a new distance $d_2$ between the first segment of SMA wire 4 and the heat sink in the form of the second part 3 is changed by an amount $\delta d = |d_1 - d_2|$ which is greater than a change $\delta l = |l_1 - l_2|$ in the length between the first and second ends 6, 8. Herein, the separation of the first segment of SMA wire 4 from one or more heat sinks, for example the second part 3, may be generally referred to as a first distance d. Herein, the length of the first segment of SMA wire 4 may be generally referred to as a second distance l. The second to fourth resilient elements 9, 11, 13 are configured in the same way as the first resilient element 7.

In the SMA actuator 1, the resilient elements 7, 9, 11, 13 have the form of crimps having angled and extended portions providing leaf springs, and arranged so that an increased tension T causes deflection of the resilient elements 7, 9, 11, 13 towards the second part 3, decreasing the first distance d from $d_2$ to $d_2$.

However, the first to fourth resilient elements 7, 9, 11, 13 are not limited to one particular implementation, and any type of resilient elements may be substituted, provided that the change $\delta d$ in the first distance d between the first segment of SMA wire 4 and at least one heat sink is increased or decreased by an amount greater than the corresponding change $\delta l$ in the second distance l between the first and second ends 6, 8. The same considerations apply to the second segment of SMA wire 5, and any further segments of SMA wire.

Instead of crimps, the herein described resilient elements may be provided with any suitable means capable of holding SMA wires.

The angle of the first to fourth resilient elements 7, 9, 11, 13 may be varied, although in general to ensure that a change in tension T causes a greater change $\delta d$ in the first distance d than the corresponding change $\delta l$ in the second distance l, the angle of the crimps providing the first to fourth resilient elements 7, 9, 11, 13 should remain relatively shallow. For example, less than or equal to 45 degrees from the direction x or plane x-y of relative motion between the first and second parts 2, 3. In other examples, the first segment of SMA wire 4 may also rotate in use (see FIGS. 11A, 11B, 12, 13 and 15), in which case it may be more practical to define an angle of less than or equal to 45 degrees from a direction oriented along the length (second distance) 1 of the first segment of SMA wire 4. This latter case may be further defined by reference to a reproducible state of the first segment of SMA wire 4 such as, for example, when the SMA wire 4 is just barely taut, or corresponding to a central configuration $x_0$.

In general, the first to fourth resilient elements 7, 9, 11, 13 could be replaced with any other resilient elements which provide a resistance to deformation against forces applied in a direction (e.g. z) corresponding to the first distance d which is less than a resistance to deformation in a direction (e.g. x) corresponding to the second distance 1. It is important to amplify the change $\delta d$ in the first distance d relative to the change $\delta l$ in the second distance 1 (length) because motion towards/away from a heat sink such as the second part 3 may be useful to increase/decrease a cooling rate of the first segment of SMA wire 4.

Additionally, any component of the change $\delta l$ in the second distance 1 (length) which is accommodated by the resilient elements 7, 9, 11, 13 (as opposed to relative motion of the first and second parts 2, 3) represents a reduction in the range of motion $x_0 \pm \Delta x$ (stroke range) of the SMA actuator 1 and should ideally be minimised. Some or all of the first to fourth resilient elements 7, 9, 11, 13 may take the form of a spring, for example a leaf spring, a carriage spring, a helical spring, a shaped region of a compliant material such as natural or synthetic rubber, and so forth.

Preferably, for a given change AT in tension of the first segment of SMA wire 4, the change $\delta d$ in the first distance d may be greater than or equal to five times, or more preferably ten times, the change $\delta l$ in the second distance 1. Any type of resilient element capable of providing the hereinbefore described functions may be used instead of the sprung crimps 7, 9, 11, 13 shown in FIGS. 1A and 1B.

Referring also to FIG. 1C, the SMA actuator 1 is shown for a third configuration 1c in which the length the first segment of SMA wire 4 has been changed (i.e. decreased) to $l_3$ whilst the length of the second segment of SMA wire 5 has been changed (i.e. increased) to $l_4 \cdot l_3$.

The tension T in the first and second segments of SMA wire 4, 5 is the same in the second and third configurations 1b, 1c, but in the third configuration 1c the first and second parts 2, 3 are shifted from the central position $x_0$ by an amount $\delta x$ which is less than the range of motion, $\delta x \leq \Delta x$.

Figure 2:
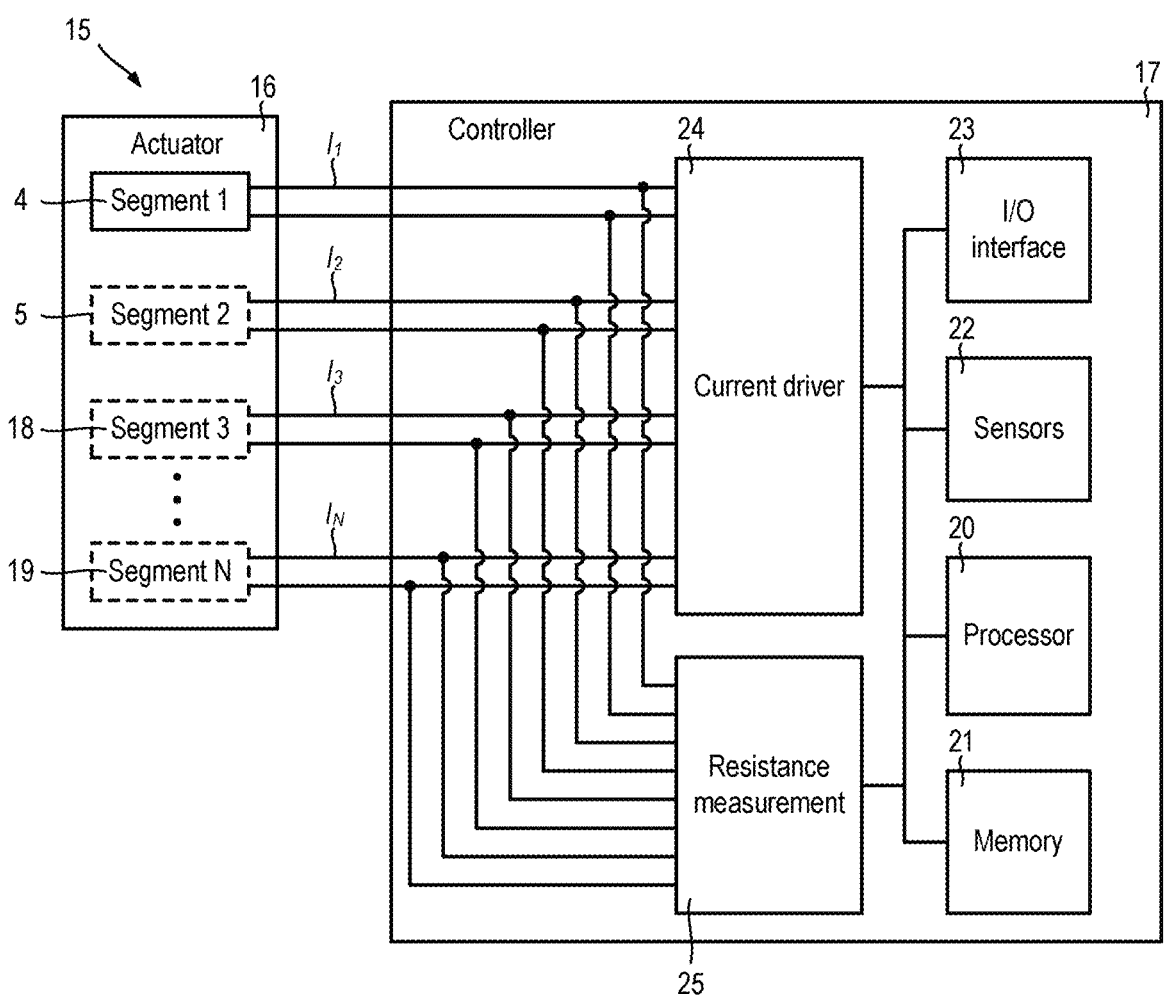
FIG. 2 schematically illustrates apparatus for controlling a general SMA actuator.

Referring also to FIG. 2, an apparatus 15 including a general SMA actuator 16 and a controller 17 is shown.

The general SMA actuator 16 includes at least the first segment of SMA wire 4 (see FIGS. 14A to 14C and 15, for example), but may optionally include the second segment of SMA wire 5, a third segment of SMA wire 18, and so forth, for any number N of further segments of SMA wire 19. The general SMA actuator 16 may take the form of any SMA actuator 1, 28, 33, 34, 36, 37, 38, 41, 42 described herein.

The controller 17 includes a processor 20, memory 21, one or more sensors 22, an input/output (I/O) interface 23, a current driver module 24 and a resistance measurement module 25. The processor 20 may take the form of one or more general purpose digital electronic central processing units (CPU). The processor 20 may be a multi-core CPU.

The memory 21 may include volatile memory and/or non-volatile memory. Typically, memory 21 may include a mixture of non-volatile memory for storing instructions and volatile memory for run-time usage by the processor 20. In some examples, a combination, or even all, of the elements of the controller 17 may be provided by a single suitably configured microcontroller, application-specific integrated circuit (ASIC), or similar device. For example, the current driver module 24 and/or some or all of the sensors 22 may be separate devices whilst all other elements of the controller 17 are provided by a single device.

The current driver module 24 supplies the first current $I_2$ to the first segment of SMA wire 4. By adjusting the first current $I_2$, a program executed by the processor 20 may control the temperature, and hence tension T and length l, of the first segment of SMA wire 4. Typically, more current $I_2$ heats the first segment of SMA wire 4, causing it to contract. The resistance $R_1$ of the first segment of SMA wire 4 is measured by the resistance measurement module 25, and is used to control the current $I_2$ using a resistance feedback control technique, for example as described in WO 2014/076463 A1, which is incorporated herein by this reference. The current driver module 24 and resistance measurement module 25 may be used to supply currents $I_2, I_3, \ldots, I_N$ to as many segments of SMA wire 4, 5, 18, 19 as are included in the general SMA actuator 16.

The sensors 22 may include, for example, one or more temperature sensors (not shown), gyroscopic sensors (not shown) and so forth. For example, the general SMA actuator 16 may be connected to a lens (not shown) of a camera system, and the feedback from a gyroscopic sensor (not shown) may be used to control the positioning of the lens (using drive currents $I_1, \ldots, I_N$) in order to stabilise an image focused by the lens.

The I/O interface 23 provides communication and interfacing with other components of a device incorporating the apparatus 15. For example, the apparatus 15 may be incorporated into a smart phone (not shown), and the I/O interface 23 may provide for communication with the CPU (not shown) of the smart phone.

The processor 20 of the controller 17 executes a control method to enable the relative positions of the first and second parts 2, 3 of the general SMA actuator 16 to be controlled. In examples of the general SMA actuator 16 in which the first segment of SMA wire 4 is opposed by a spring or other resilient element (see FIGS. 14A to 14C and 15), the configuration of the first segment of SMA wire 4 described hereinbefore may provide advantageous effects, for example by increasing cooling rates towards one or more edges of the range of motion $x_0 \pm \Delta x$, as further described hereinafter.

Active adjustment of cooling rates is possible in examples of the general SMA actuator 16 for which the first segment of SMA wire 4 is opposed by one or more segments of SMA wire, for example second, third and further segments of SMA wire 5, 18, 19. For example, if the first SMA actuator 1 is used with the controller 17. This is a consequence of the possibility of varying tension T and actuator displacement $\delta x$ independently within at least part of the range of motion $x_0 \pm \Delta x$. In such examples, a control method executed by the processer 20 may control relative displacements $\delta x$ of the first and second parts 2, 3, whilst additionally controlling (or at least influencing) a cooling rate of the segments of SMA wire 4, 5, 18, 19, by adjusting the tension T of each group of opposed of SMA wire segments 4, 5, 18, 19. For example, moving a segment of SMA wire 4, 5, 18, 19 towards at least one heat sink increases the cooling rate (increased flux J), whilst moving that segment of SMA wire 4, 5, 18, 19 away from heat sinks decreases the cooling rate (decreased flux J).

In some examples, in addition to decreasing the first distance d (clearance) of a segment of SMA wire 4, 5, 18, 19, the tension T could be used to bring that segment of SMA wire 4, 5, 18, 19 into contact with a heat sink, for example mounted on or protruding from the first or second parts 2, 3, further increasing the rate of cooling. In the case of contact with a heat sink, that heat sink should be electrically insulated/isolated to avoid shorting of the control current(s) $I_1, \ldots, I_N$.

Active adjusting of cooling rates may be useful in actuators 1, 16 applied to camera auto-focus (AF) applications. For example, transition times may be accelerated by shifting segments of SMA wires 4, 5, 18, 19 closer to one or more heat sinks to increase cooling rates (increase heat flux J). At other times when the AF system is idle, cooling rates may be decreased (reducing heat flux J) to reduce power consumption ($I^2R$ needed to balance J to maintain a desired temperature). Reducing power consumption means reduced heat generation, which may also help to keep the ambient temperature of an actuator 1, 16 lower until displacement $\delta x$ of the actuator 1, 16 is needed. Additionally or alternatively, active influencing of cooling rates may be used to reduce power consumption at low ambient temperatures, because segments of SMA wire 4, 5, 18, 19 may be moved further from nearby heat sinks.

Further examples of active adjustment of cooling rates are described hereinafter (see FIGS. 3 to 6).

In the first SMA actuator 1 the function of a heat sink is provided by the physical structure of the second part 3. Heat sinks are not limited to this, and the general actuator 16 may include one, two or more heat sinks. The structure(s) of either or both of the first and second parts 2, 3 may function as heat sinks.

Additionally, a housing (not shown) and/or other components of the general actuator 16 may function as a heat sink. Heat sinks may also be provided in the form of protrusions integrated with, or mounted to either of, the first and second parts 2, 3 (see e.g. heat sinks 52 in FIG. 18). Typically heat sinks may be passive, utilising thermal mass and thermal conductance to dissipate heat generated by a segment of SMA wire 4, 5, 18, 19 away from that segment of SMA wire 4, 5, 18, 19. However, the examples of the present specification are equally applicable to actively cooled heat sinks.

Passive tension regulation In addition to other effects described herein, a general SMA actuator 16 such as the SMA actuator 1 can also provide passive tension regulation as described hereinafter.

In many SMA actuators, the controller 17 advantageously regulates the tension T of the segments of SMA wire 4, 5, 18, 19 (versus changes in ambient temperature $\Theta$) by changing the average drive currents $I_1, \ldots, I_N$ supplied to the segments of SMA wire 4, 5, 18, 19 as a function of ambient temperature $\Theta$. However, this active tension regulation requires a temperature sensor etc. Passive tension regulation can be provided in examples of the general SMA actuator 16 in which at least a first segment of SMA wire 4 moves closer to one or more heat sinks in response to an increase in its tension T. For a constant drive current $I_2$, an increase in ambient temperature will tend to cause the temperature and hence the tension T of the first segment of SMA wire 4 to increase. This causes the first segment of SMA wire 4 to move closer to one or more heat sinks (e.g. the second part 3) and the resulting increase in cooling rate will tend to counteract the increase in temperature and hence tension T of the first segment of SMA wire 4 due to the increase in ambient temperature. The opposite applies for a decrease in ambient temperature. Although described in relation to the first segment of SMA wire 4, this is also applicable to all segments of SMA wire 4, 5, 18, 19 which may be included in a general SMA actuator 16.

In short, the introduction of resilient elements 7, 9, 11, 13 can have the effect of at least reducing the dependence of wire tension on ambient temperature and hence the need for active tension regulation. Consequently, controllers 17 may be able to use temperature sensors having lower sensitivity and/or accuracy (and lower cost) or even omit a temperature sensor entirely (and omit consideration of ambient temperature).

First Method of Actively Adjusting Cooling Rate

Figure 3:
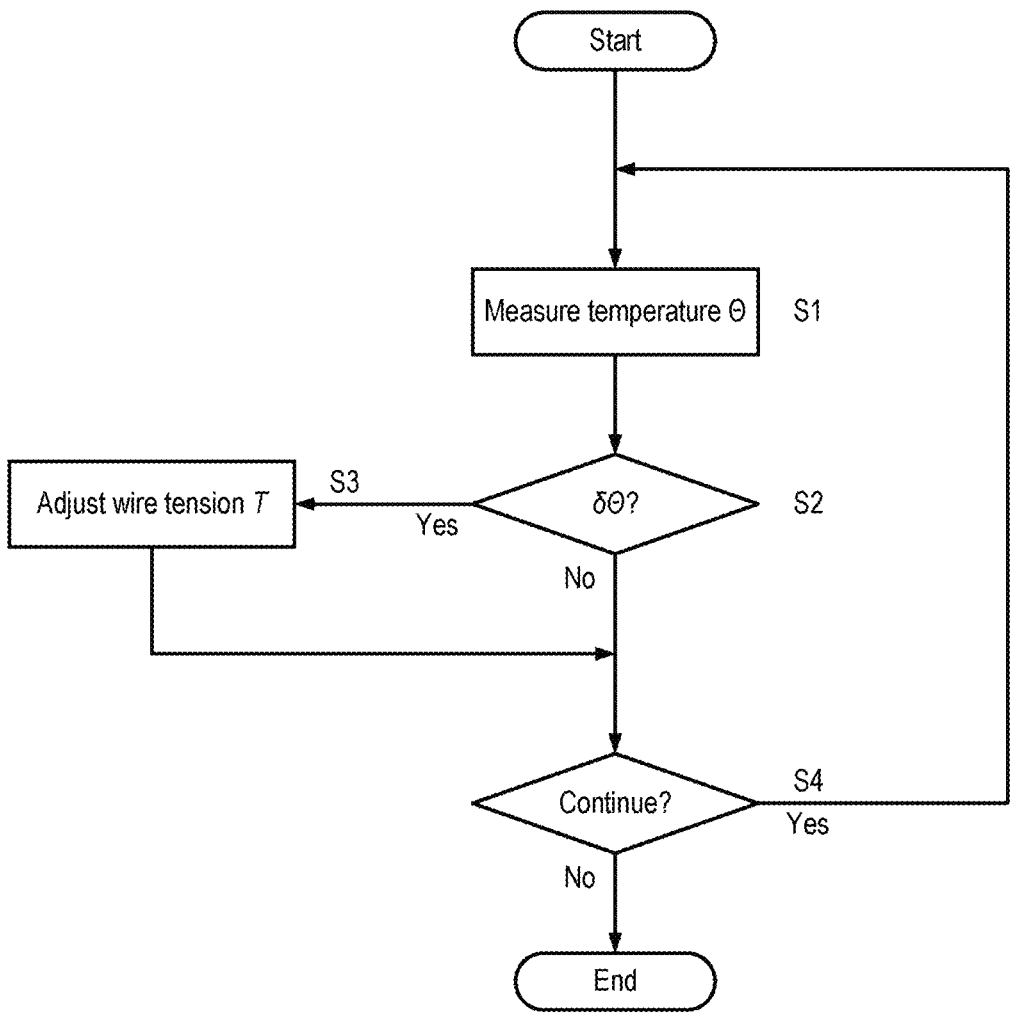
FIG. 3 is a process-flow diagram of a first method of actively adjusting a cooling rate of a segment of SMA wire.

Referring also to FIG. 3, a first method of actively adjusting (or at least influencing) a cooling rate of a first segment of SMA wire 4 is illustrated.

As mentioned hereinbefore, the first method is applicable to a first segment of SMA wire 4 the contraction of which is opposed by one or more other segments of SMA wire 5, 18, 19, so that tension T in the segments of SMA wire 4, 5, 18, 19 may be varied independently of displacement $\delta x$ between first and second parts 2, 3 (at least over part of the range of motion $x_0 \pm \Delta x$). The first SMA actuator 1 is an example of a general SMA actuator 16 which the first method is applicable to. The first method may be carried out by a program executed by the processor 20 of the controller 17.

Concurrently with the first method, the controller 17 will continue to provide the function of controlling relative displacement $\delta x$ between the first and second parts 2, 3.

One or more temperatures $\Theta$ corresponding to the first segment of SMA wire 4 are measured (step S1). For example, the sensors 22 may include a temperature sensing module (not shown). The temperatures $\Theta$ may include an ambient temperature $\Theta_o$ of the general SMA actuator 16 or a device incorporating it, and may be directly measured by the temperature sensing module of the sensors 22. Additionally or alternatively, the temperatures $\Theta$ may include a temperature $\Theta_{wire}$ of the first segment of SMA wire 4. A temperature $\Theta_{wire}$ of the first segment of SMA wire 4 may be determined (or estimated or calculated) using the processor 20, based on a history of power $I_1^2 R_1$ supplied to the first segment of SMA wire 4 by the current driver 24 and a measurement of ambient temperature $\Theta_o$ obtained using the sensors 22. Additionally or alternatively, because resistance $R_1$ varies as a function of temperature, a resistance $R_1$ obtained from the resistance measurement module 25 may be used when estimating the temperature $\Theta_{wire}$ of the first segment of SMA wire 4.

It is checked whether the temperatures $\Theta$ corresponding to the first segment of SMA wire 4 have changed $\delta\Theta$ (step S2). For example, the measured temperatures $\Theta$ may be compared to a buffer of one or more previously measured temperatures $\Theta$. If there is no change $\delta\Theta$ (step S21 No), the controller 17 continues to monitor temperatures $\Theta$ corresponding to the first segment of SMA wire 4.

If there is a change $\delta\Theta$ in one or more temperatures $\Theta$ corresponding to the first segment of SMA wire 4 (step S2|Yes), then the tension T of the first segment of SMA wire 4 is adjusted in dependence on the change $\delta\Theta$ (step S3).

By adjusting the tension T, the cooling rate of the first segment of SMA wire 4 may be adjusted (or at least influenced) by moving the first segment of SMA wire 4 towards or away from one or more heat sinks. Such adjustments are provided by the deflection of the first resilient element 7, and if present the second resilient element 9. Adjusting the first distance d of the first segment of SMA wire 4 from at least one of the heat sinks may correspond to adjusting a mean average distance d along the length/of the first segment of SMA wire 4.

In general the first distance d (wire clearance) should be reduced at high temperatures $\Theta$ in order to increase cooling rates, and then reduced at low temperatures $\Theta$ to reduce power consumption. Examples of specific control schemes are described hereinafter.

Whilst the general SMA actuator 16 remains in use (step S4|Yes), the control loop is repeated.

Although described in relation to the first segment of SMA wire 4, the first method is applicable to all segments of SMA wire 4, 5, 18, 19 which are included in a general SMA actuator 16 controlled by a controller 17.

Second Method of Actively Adjusting Cooling Rate

Figure 4:
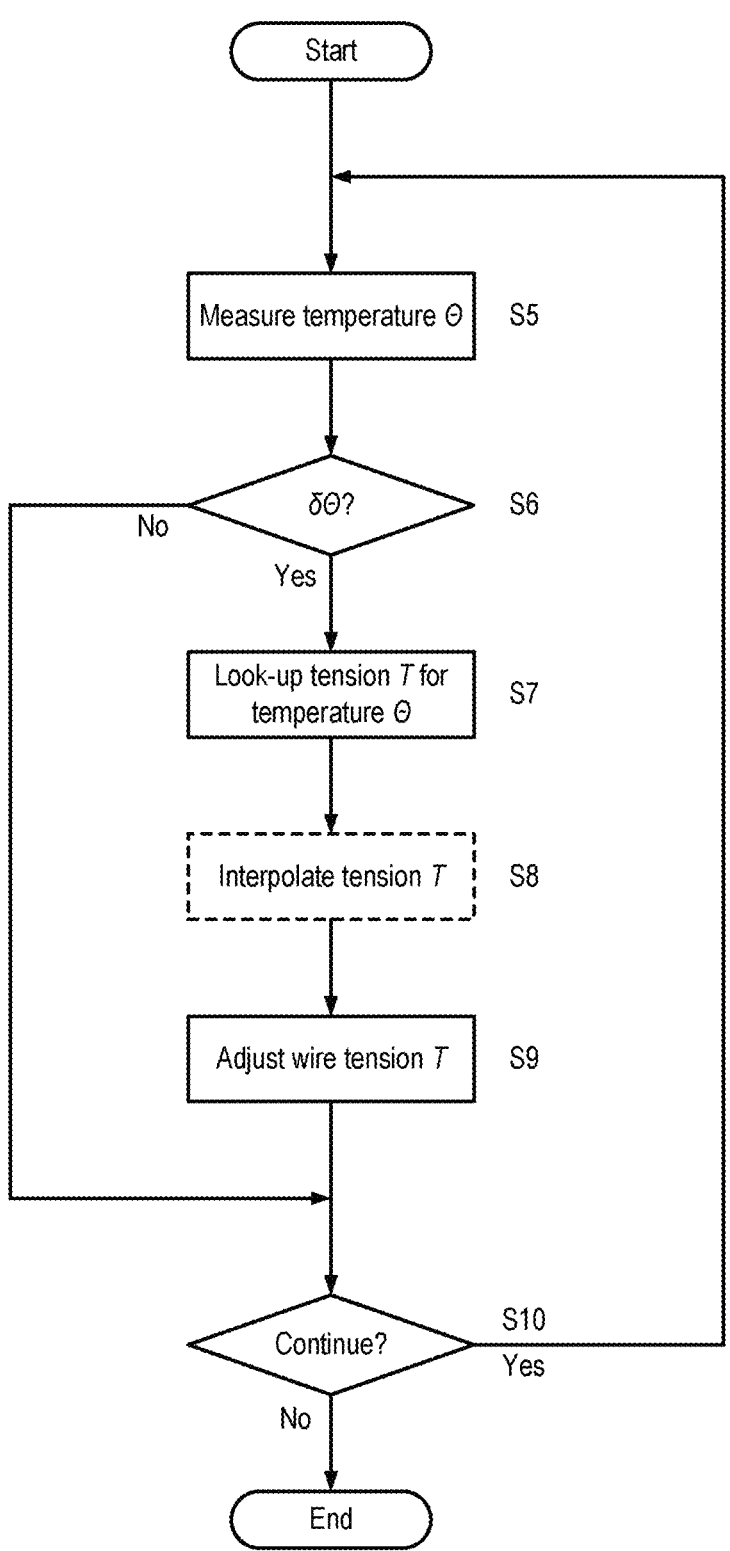
FIG. 4 is a process-flow diagram of a second method of actively adjusting a cooling rate of a segment of SMA wire.

Referring also to FIG. 4, a second method of actively adjusting (or at least influencing) cooling rate of a first segment of SMA wire 4 is illustrated. The second method represents one example of implementing the first method.

The second method is applicable to a first segment of SMA wire 4 the contraction of which is opposed by one or more other segments of SMA wire 5, 18, 19, so that tension T in the segments of SMA wire 4, 5, 18, 19 may be varied independently of displacement $\delta x$ between first and second parts 2, 3 (at least over part of the range of motion $x_0 \pm \Delta x$). The SMA actuator 1 is an example of a general SMA actuator 16 which the second method is applicable to. The second method may be carried out by a program executed by the processor 20 of the controller 17.

Concurrently with the second method, the controller 17 will continue to provide the function of controlling relative displacement $\delta x$ between the first and second parts 2, 3.

One or more temperatures $\Theta$ are measured and/or calculated (step S5) in the same way as for the first method (step S1). If there is no change in temperature $\delta\Theta$ (step S6|No), then the tension T of the first segment of SMA wire 4 is not modified, and whilst the general actuator 16 is in use (step S10|Yes), monitoring of temperatures $\Theta$ corresponding to the first segment of SMA wire 4 continues (step S5).

In response to measuring a change $\delta\Theta$ in one or more monitored temperatures $\Theta$ (step S6|Yes), a tension T(O) corresponding to the new temperature $\Theta$ is retrieved from a look-up table (not shown) (step S7). The look-up table stores pre-calibrated values of tension T(O) corresponding to particular temperature $\Theta$.

Each pre-calibrated value of tension T(O) will correspond to a particular first distance d, depending on the specific mechanical compliance of the first resilient element 7 (and if used the second resilient element 9) parallel and perpendicular to the length/direction (second distance). The temperature $\Theta$ used for the reference to the look-up table may be an ambient temperature $\Theta_o$, but is preferably a temperature $\Theta_{wire}$ of the first segment of SMA wire 4. When the temperature $\Theta$ is between a pair of pre-calibrated temperatures $\Theta_a$, $\Theta_b$ stored in the look-up table, the closest pre-calibrated temperatures $\Theta_a$, $\Theta_b$ may be used.

Alternatively and optionally, a tension T($\Theta$) corresponding to a temperature $\Theta$ may be interpolated using the tensions $T_a = T(\Theta_a)$ $T_b = T(\Theta_b)$ corresponding to pre-calibrated temperatures $\Theta_a$, $\Theta_b$ which bracket the temperature $\Theta_a < \Theta < \Theta_b$ (step S8).

The tension T of the first segment of SMA wire 4 is adjusted to the value T(O) retrieved (or interpolated) using the look-up table (step S9). The tension T may be decreased by reducing the drive currents $I_2$ to allow the first segment of SMA wire to cool and extend in length l. The drive currents $I_2, I_3, \ldots, I_N$ supplied to segments of SMA wire 5,

18, 19 opposing the first segment of SMA wire 4 will also need to be reduced to reduce the tension T without causing a change in displacement $\delta x$ between the first and second parts 2, 3. The tension T may be increased by increasing the drive currents $I_2$ to cause the first segment of SMA wire to contract in length l, whilst correspondingly increasing the drive currents $I_2, I_3, \ldots, I_N$ supplied to segments of SMA wire 5, 18, 19 opposing the first segment of SMA wire 4 to prevent a change in displacement $\delta x$.

Whilst the general actuator 16 remains in use (step S10|Yes), the control loop is repeated.

Although described in relation to the first segment of SMA wire 4, the second method is applicable to all segments of SMA wire 4, 5, 18, 19 which are included in a general SMA actuator 16 controlled by a controller 17.

Third Method of Actively Adjusting Cooling Rate

Figure 5:
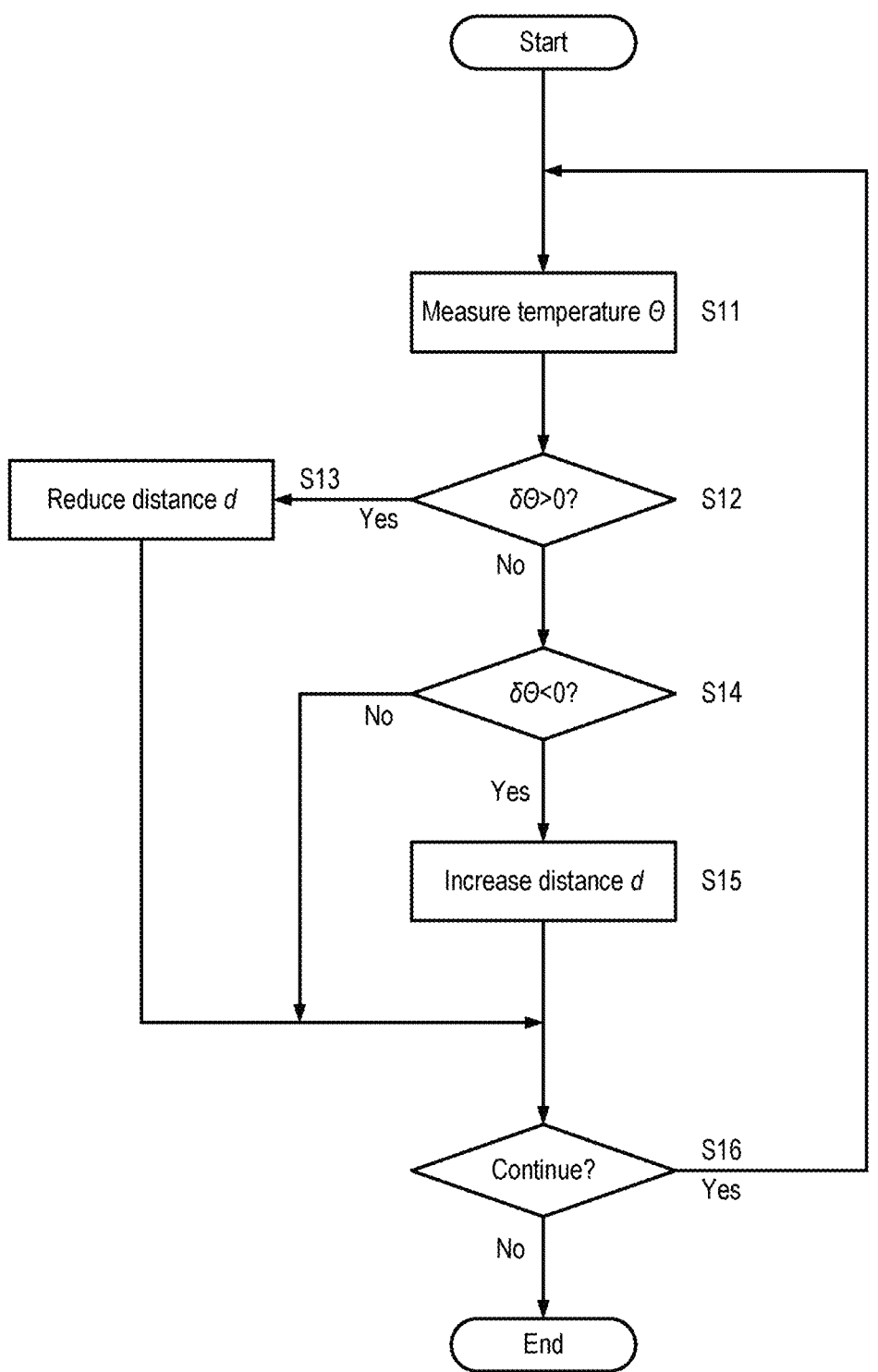
FIG. 5 is a process-flow diagram of a third method of actively adjusting a cooling rate of a segment of SMA wire.

Referring also to FIG. 5, a third method of actively adjusting (or at least influencing) cooling rate of a first segment of SMA wire 4 is illustrated. The third method represents an example of implementing the first method.

The third method is applicable to a first segment of SMA wire 4 the contraction of which is opposed by one or more other segments of SMA wire 5, 18, 19, so that tension T in the segments of SMA wire 4, 5, 18, 19 may be varied independently of displacement $\delta x$ between first and second parts 2, 3 (at least over part of the range of motion $x_0 \pm \Delta x$). The first SMA actuator 1 is an example of a general SMA actuator 16 which the third method is applicable to. The third method may be carried out by a program executed by the processor 20 of the controller 17.

Concurrently with the third method, the controller 17 will continue to provide the function of controlling relative displacement $\delta x$ between the first and second parts 2, 3.

One or more temperatures are measured and/or calculated (step S11) in the same way as for the first and second methods (steps S1, S5).

In response to an increase $\delta\Theta > 0$ in the temperature (step S12|yes), the first distance d separating the first segment of SMA wire 4 from at least one heat sink incorporated in the general SMA actuator 16 is reduced (S13). The first distance d may be reduced by increasing or decreasing the tension T of the first segment of SMA wire 4, depending on the precise configuration of the first resilient element 7. The tensions T of the one or more other segments of SMA wire 5, 18, 19 opposing the first segment of SMA wire 4 are adjusted correspondingly. An example of a second SMA actuator 28 in which decreased tension T decreases the first distance d is described hereinafter in relation to FIGS. 8A and 8B.

In response to a decrease $\delta\Theta < 0$ in the temperature (step S12|no, step S14|Yes), the first distance d separating the first segment of SMA wire 4 from at least one heat sink incorporated in the general SMA actuator 16 is increased (S15). The first distance d may be increased by increasing or decreasing the tension T of the first segment of SMA wire 4, depending on the precise configuration of the first resilient element 7. The tensions T of the one or more other segments of SMA wire 5, 18, 19 opposing the first segment of SMA wire 4 are adjusted correspondingly.

Whilst the general actuator 16 remains in use (step S16|Yes), the control loop is repeated.

Although described in relation to the first segment of SMA wire 4, the third method is applicable to all segments of SMA wire 4, 5, 18, 19 which are included in a general SMA actuator 16 controlled by a controller 17.

Although described separately from the second method, features of the second and third methods may be combined in any compatible way. For example, a target change in the first distance δd may be retrieved from a look-up table on the basis of the change in temperature δΘ and optionally also the current ambient $\Theta_o$ or wire $\Theta_{wire}$ temperatures.

Fourth Method of Actively Influencing Cooling Rate

Figure 6:
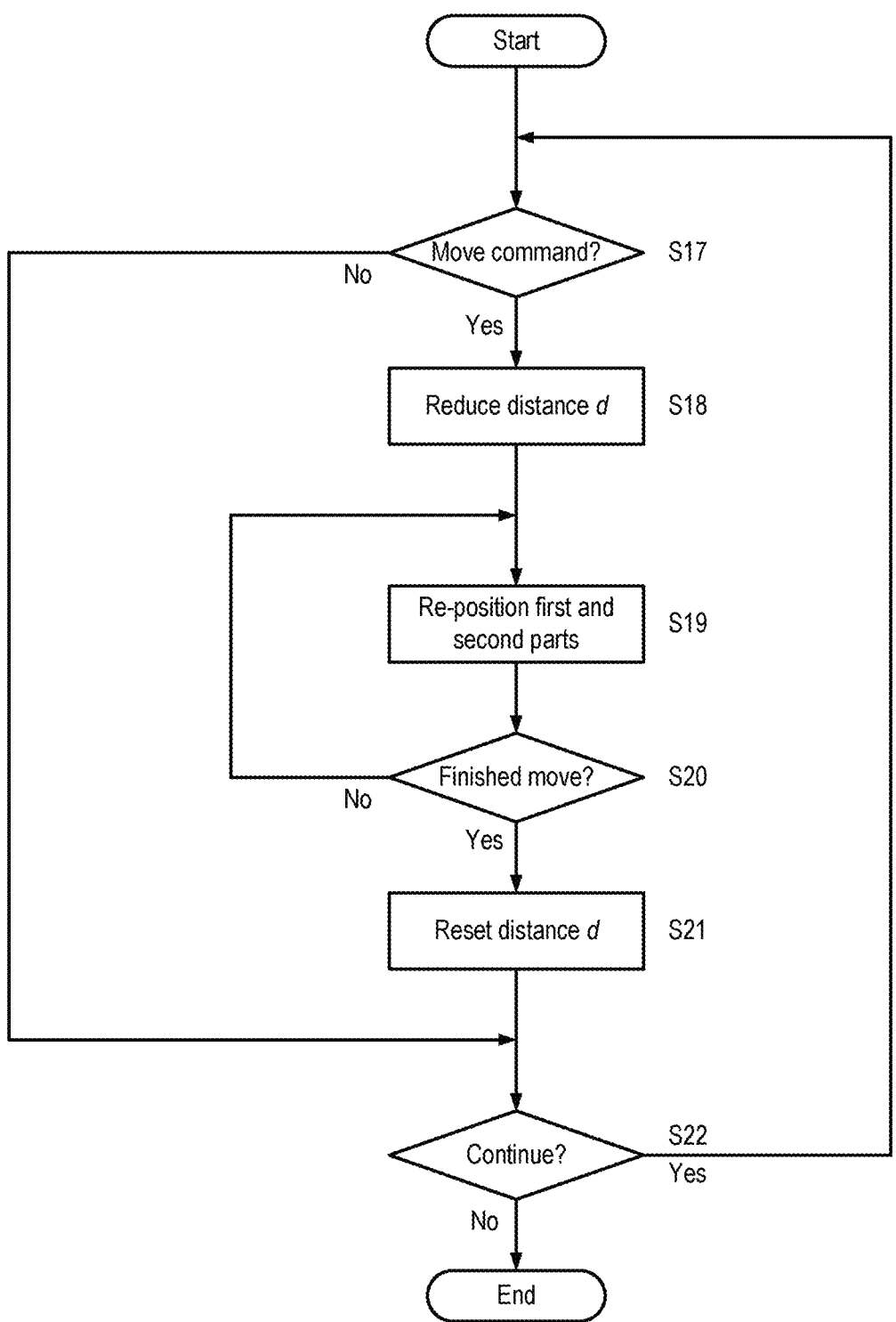
FIG. 6 is a process-flow diagram of a fourth method of actively adjusting a cooling rate of a segment of SMA wire.

Referring also to FIG. 6, a fourth method of actively adjusting (or at least influencing) cooling rate of a first segment of SMA wire 4 is illustrated. The fourth method is concerned with adjusting cooling rates in dependence on the activity of a general actuator 16, rather than in response to changing temperatures Θ.

The fourth method is applicable to a first segment of SMA wire 4 the contraction of which is opposed by one or more other segments of SMA wire 5, 18, 19, so that tension T in the segments of SMA wire 4, 5, 18, 19 may be varied independently of displacement δx between first and second parts 2, 3 (at least over part of the range of motion $x_0 \pm \Delta x$). The first SMA actuator 1 is an example of a general SMA actuator 16 which the fourth method is applicable to. The fourth method may be carried out by a program executed by the processor 20 of the controller 17.

Concurrently with the fourth method, the controller 17 will continue to provide the function of controlling relative displacement δx between the first and second parts 2, 3. The fourth method may additionally or alternatively be executed concurrently with, or integrated into, any of the first to third methods.

The objective of the fourth method is to increase cooling rates, and consequently responsivity, of the first segment of SMA wire 4 starting just prior to movement (displacement) of a general SMA actuator 16. Once the relative motions of the first and second parts 2, 3 has ceased, the first segment of SMA wire 4 may be moved back to a greater first distance d (separation/clearance) in order to reduce overall power consumption.

The fourth method is triggered by reception of a command to change the relative displacement δx between the first and second parts 2, 3 (step S17). The command may be received via the I/O interface 23 or may be generated internally by the controller 17. For example, in an implementation of optical image stabilisation, the command may be generated by the processor 20 in response to a gyroscope of the sensors 22 detecting an acceleration.

Before, or concurrently with, controlling the segments of SMA wire 4, 5, 18, 19 to shift the relative displacement δx of the first and second parts 2, 3, the first distance d of the first segment of SMA wire 4 is reduced (step S18). The first distances d of the one or more other segments of SMA wire 5, 18, 19 opposing the first segment of SMA wire 4 are also adjusted correspondingly.

The first segment of SMA wire 4 (and opposing segments of SMA wire 5, 18, 19) is held at the reduced distance whilst the first and second parts 2, 3 are re-positioned (step S19), until the necessary relative displacement δx (shift) has been obtained (step S20|Yes).

Once the move has been completed, the first distances d are reset to a larger, resting value in order to reduce power consumption (step S21).

In a simple implementation of the fourth method, a fixed change $\delta d_{move}$ in the first distance d may be applied between moving and stationary states.

In other implementations, the controller 17 may store two profiles of the first distance d as a function of displacement δx within the range of motion $x_0 \pm \Delta x$.

For example, a first function $d_{static}(\delta x)$ may define the target distance d when the actuator is not moving, whilst a second function $d_{move}(\delta x)$ defines the target distance d when the actuator is moving. The functions should satisfy $d_{static}(x) > d_{move}(x)$ for displacements δx in the range of motion: $x_0 - \Delta x < \delta x < x_0 + \Delta x$.

Starting from a first displacement $\delta x_1$ (relative to the central configuration $x_0$) the controller 17 may adjust the tension T to shift from $d_{static}(\delta x_2)$ to $d_{move}(\delta x_1)$ (step S18), move the first and second parts 2, 3 relative to one another to a second displacement $\delta x_2$ (steps S19 & S20), then adjust the tension T to shift from $d_{move}(\delta x_2)$ to $d_{static}(\delta x_2)$ (step S21).

Whilst the general actuator 16 remains in use (step S22|Yes), the control loop is repeated.

Although described in relation to the first segment of SMA wire 4, the fourth method is applicable to all segments of SMA wire 4, 5, 18, 19 which are included in a general SMA actuator 16 controlled by a controller 17.

Although described separately from the first to third methods, features of the first to fourth methods may be combined in any compatible way.

Figure 7:
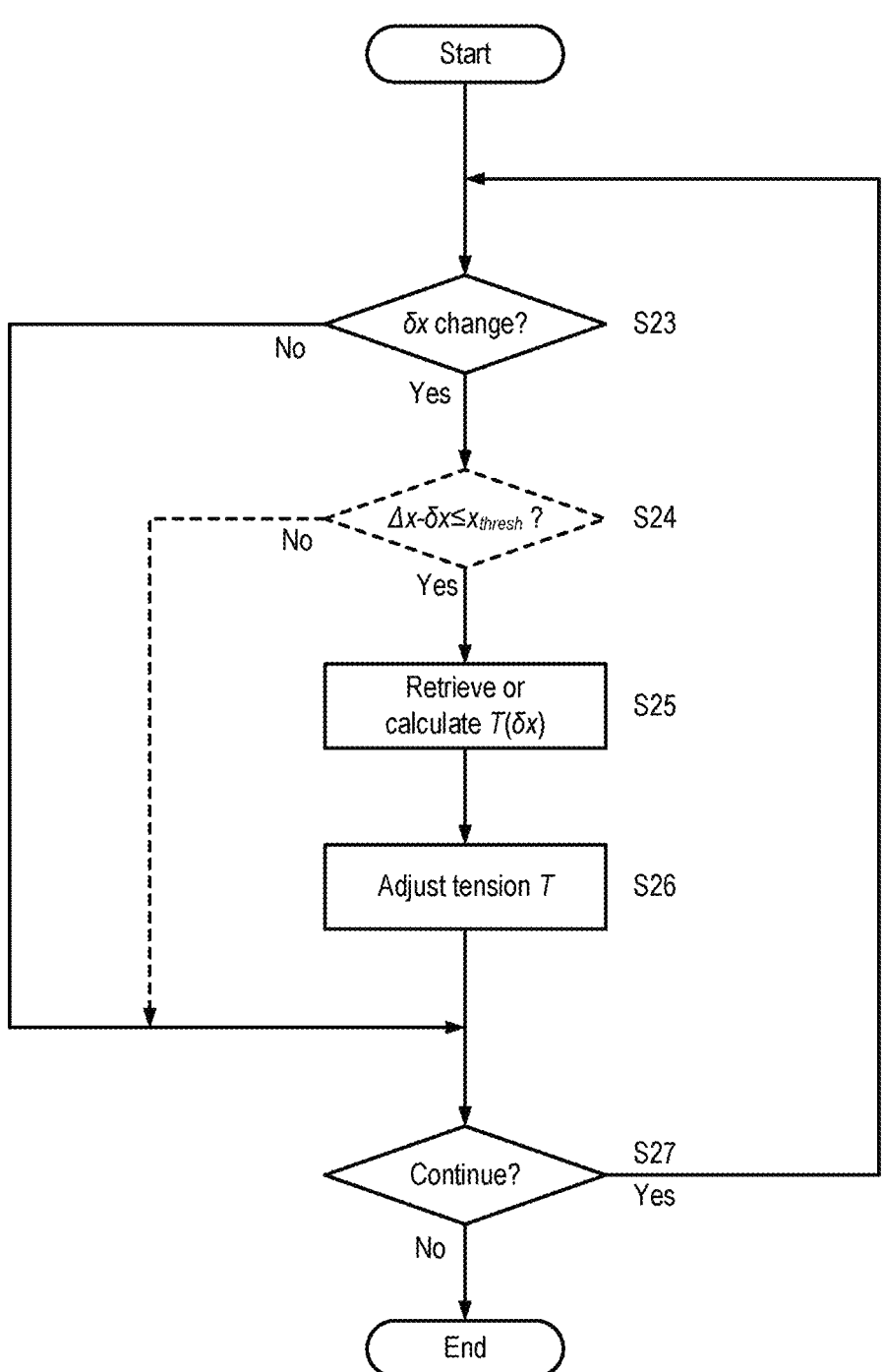
FIG. 7 is a process-flow diagram of a fifth method of actively adjusting a cooling rate of a segment of SMA wire.

Fifth Method of Actively Influencing Cooling Rate Referring also to FIG. 7, a fifth method of actively adjusting (or at least influencing) cooling rate of a first segment of SMA wire 4 is illustrated. The fifth method is concerned with adjusting cooling rates in dependence on the current displacement δx of a general SMA actuator 16 within the range of motion $x_0 \pm \Delta x$.

The fifth method is applicable to a first segment of SMA wire 4 the contraction of which is opposed by one or more other segments of SMA wire 5, 18, 19, so that tension T in the segments of SMA wire 4, 5, 18, 19 may be varied independently of displacement δx between first and second parts 2, 3 (at least over part of the range of motion $x_0 \pm \Delta x$). The first SMA actuator 1 is an example of a general SMA actuator 16 which the fifth method is applicable to. The fifth method may be carried out by a program executed by the processor 20 of the controller 17.

Concurrently with the fifth method, the controller 17 will continue to provide the function of controlling relative displacements δx between the first and second parts 2, 3. The fifth method may additionally or alternatively be executed concurrently with, or integrated into, any of the first to third methods and/or the fourth method.

The temperature change required to achieve a given change in displacement δx of a general SMA actuator 16 is typically much larger at the extremes $x_0 \pm \Delta x$ of the range of motion of the general SMA actuator 16 actuator than when close to the central configuration $x_0$. This is a consequence of nonlinear behaviour of SMA materials, and may cause a rate of motion of the general SMA actuator 16 to be relatively lower at the extremes $x_0 \pm \Delta x$ of the range of motion of the general SMA actuator 16 actuator than when close to the central configuration $x_0$. The objective of the fifth method is to increase cooling rates, and consequently responsivity, of the first segment of SMA wire 4 as a general SMA actuator 16 moves to displacements δx away from the central configuration $x_0$ and/or approaches an extreme $x_0 \pm \Delta x$ of the range of motion.

Whenever the general actuator 16 is displaced (step S23|Yes), the controller 17 retrieves or calculates a new target tension T(δx) depending on the current displacement δx of the general SMA actuator 16 (step S25).

The current driver module than adjusts one, some or all of the drive currents $I_1, I_2, I_3, \ldots, I_N$ in order to adjust the tension T of the first segment of SMA wire 4 to the retrieved or calculated position dependent target tension T(x) (step S26). As described hereinbefore, the first resilient element 7 (and any other resilient elements 9, 11, 13 used) cause a change in tension T to also produce a change in the first distance d of the first segment of SMA wire 4 from at least one heat sink. First distances d of one or more SMA wire segments 5, 18, 19 opposing the first segment of SMA wire 4 will be correspondingly changed. In this way, the fifth method has the effect of adjusting the first distance d of the first segment of SMA wire 4 from at least one heat sink based on the relative displacement δx of the first and second parts 2, 3 within the range of movement $x_0 \pm \Delta x$.

The precise nature of the relationship between actuator displacement δx and tension T(x) (or equivalently first distance d) may take any suitable form. For example, the fifth method may adjust the tension T(x) in order to increase the first distance d in response to the displacement δx between first and second parts 2, 3 moving closer to the central configuration $x_0$ of the range of motion $x_0 \pm \Delta x$, and to adjust the tension T(x) in order to decrease the first distance d in response to the displacement δx moving away from the centre $x_0$ of the range of motion $x_0 \pm \Delta x$. In this way, the cooling rate may be increased as the edges of the range of motion $x_0 \pm \Delta x$ are approached in order to provide improved responsivity of the first segment of SMA wire 4, and decreased as the central configuration $x_0$ is approached to minimise excess power consumption.

In another example, the displacement δx from the central position $x_0$ may be checked against a threshold as a precondition for adjusting tension T and hence the first distance d of the first segment of SMA wire 4 (step S24). For example, the distance from the edges of the range of motion $\Delta x - \delta x$ may be compared to a threshold distance $x_{thresh}$. If the general SMA actuator 16 has moved within the threshold distance $x_{thresh}$ of the edges of the range of motion $x_0 \pm \Delta x$ (step S24|Yes) then the tension T may be adjusted to reduce the first distance d and increase the cooling rate of the first segment of SMA wire 4 (steps S25, S26).

The threshold distance $x_{thresh}$ may take any suitable value, for example, 20%, 15%, 10% or 5% of the range $\Delta x$.

Whilst the general actuator 16 remains in use (step S27|Yes), the control loop is repeated.

Although described in relation to the first segment of SMA wire 4, the fifth method is applicable to all segments of SMA wire 4, 5, 18, 19 which are included in a general SMA actuator 16 controlled by a controller 17.

Although described separately from the first to fourth methods, features of the first to fifth methods may be combined in any compatible way.

Second SMA Actuator

Figure 8A:
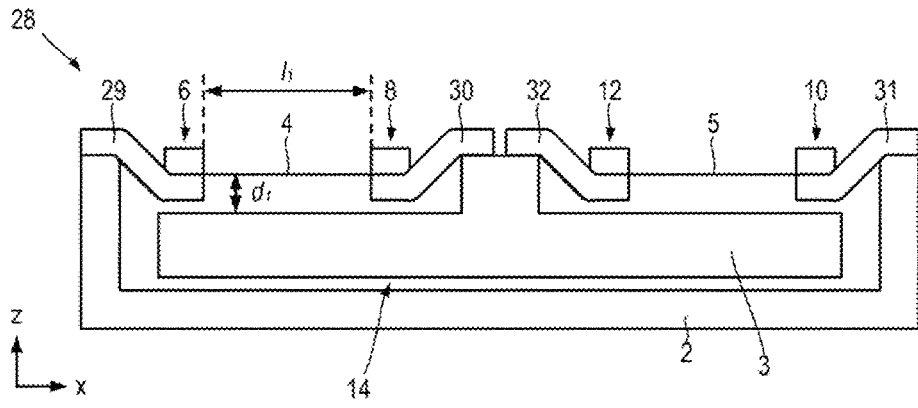
FIGS. 8A to 8C schematically illustrate a second SMA actuator.

Referring also to FIG. 8A, a second example of a SMA actuator 28 is shown.

The second SMA actuator 28 is the same as the first SMA actuator 1, except that the first to fourth resilient elements 7, 9, 11, 13 have been respectively replaced by fifth to eighth resilient elements 29, 30, 31, 32. The second SMA actuator 28 is an example of a general SMA actuator 16. The first segment of SMA wire 4 is connected to the first part 2 via the fifth resilient element 29. In contrast to the first resilient element 7 which moves the first SMA wire 4 towards the heat sink in the form of the second part 3 in response to an increased tension T, the fifth resilient element 29 is configured to move the first SMA wire 4 away from the second part 3 in response to an increased tension T.

Figure 8B:
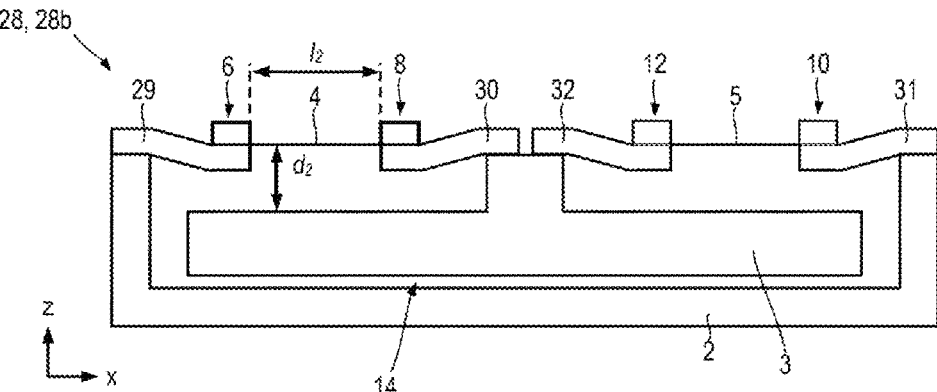

Referring also to FIG. 8B, a second configuration 28*b* is shown corresponding to the second SMA actuator 28 when the first and second segments of SMA wire 4, 5 have been caused to contract by increasing the respective drive currents $I_1$, $I_2$.

The initial or central configuration $x_0$ with first and second segments of SMA wire 4, 5 having lengths $l_1$ and first distances $d_2$ is shown in FIG. 8A. In FIG. 8B, the lengths of the first and second segments of SMA wire 4 have both been caused to contract to a shorter length $l_2$. Consequently, the fifth to eighth resilient elements 29, 30, 31, 32 carrying the first and second segments of SMA wire 4, 5 have been deflected up and away from the heat sink in the form of the second part 3, to a new distance $d_2$ each. In this way, the cooling rates of the first and second segments of SMA wire 4, 5 may be decreased in response to an increase in tension T of the opposed segments of SMA wire 4, 5.

In the second configuration 28*b*, the first and second segments of SMA wire 4 have both been caused to contract to the same length $l_2$ so that there is no net displacement δx. Of course, if the first and second segments of SMA wire 4 are caused to contract to different lengths there will be a change in displacement δx in addition to any change in tension T. Tension T and displacement δx may be varied independently over at least a portion of the range of motion $x_0 \pm \Delta x$ of the second SMA actuator 28.

The second SMA actuator 28 may be viewed as being the same as the first SMA actuator 1, except with the effects of tension T being reversed.

The fifth resilient element 29 is configured such that in response to a change δT in tension T of the first segment of SMA wire 4, the new distance $d_2$ between the first segment of SMA wire 4 and the heat sink in the form of the second part 3 is changed by an amount $\delta_d = |d_1 - d_2|$ which is greater than a change $\delta l = |l_1 - l_2|$ in the length between the first and second ends 6, 8.

The sixth to eighth resilient elements 30, 31, 32 are configured similarly to the fifth resilient element 29.

In the second SMA actuator 28, the resilient elements 29, 30, 31, 32 have the form of crimps having angled and extended portions providing leaf springs, and arranged so that an increased tension T causes deflection of the resilient elements 29, 30, 31, 32 away from the second part 3, increasing the first distance d from $d_2$ to $d_2$. However, the fifth to eighth resilient elements 29, 30, 31, 32 are not limited to this implementation, and may be substituted for any alternative resilient elements providing the appropriate function such as, for example, a leaf spring, a carriage spring, a helical spring, a shaped region of a compliant material such as natural or synthetic rubber, and so forth. The considerations and alternatives discussed hereinbefore in relation to the first to fourth resilient elements 7, 9, 11, 13 are equally applicable to the fifth to eighth resilient elements 29, 30, 31, 32.

Although the second SMA actuator 28 is illustrated including first and second segments of SMA wire 4, 5, a general SMA actuator 16 may include up to a number N of segments of SMA wire 4, 5, 18, 19. Each segment of SMA wire 4, 5, 18, 19 in a general SMA actuator 16 may be configured in the same way as the first and second segments of SMA wire 4, 5 of the second SMA actuator 28.

Figure 8C:
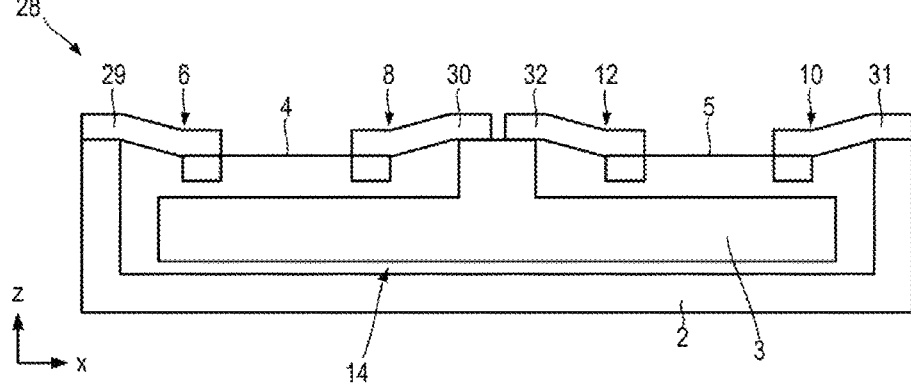

The fifth to eight resilient elements 29, 30, 31, 32 may be configured to hold the first and second segments of SMA wire 4, 5 as shown in FIG. 8C, wherein the wire holding portions l wire coupling components (e.g. crimps) of the resilient elements 29, 30, 31, 32 are internally located between the flexible portions of the resilient elements 29, 30, 31, 32 and the second part 3, rather than externally located.

Third SMA Actuator

Figure 9A:
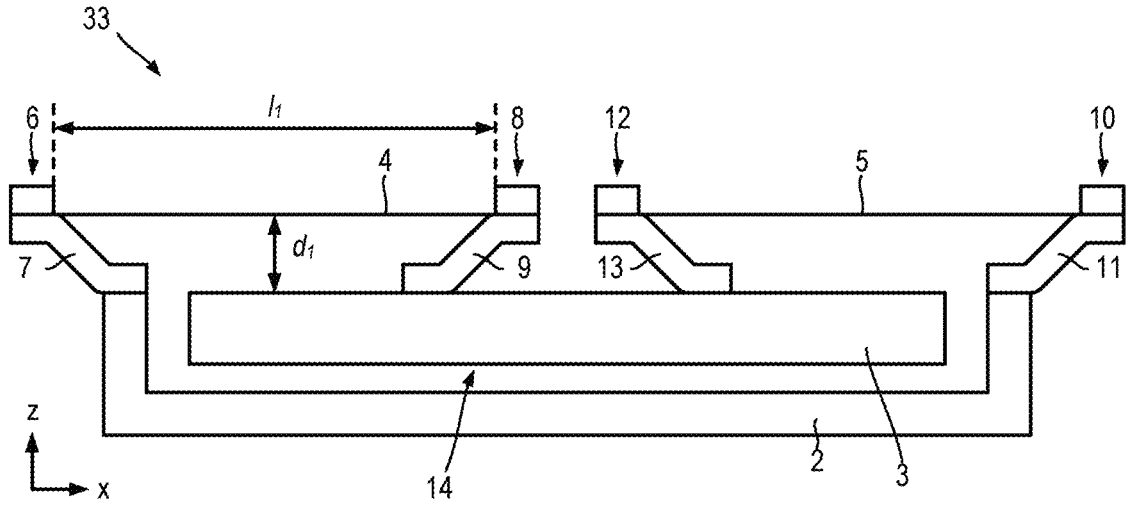
FIGS. 9A and 9B schematically illustrate a third SMA actuator.
Figure 9B:
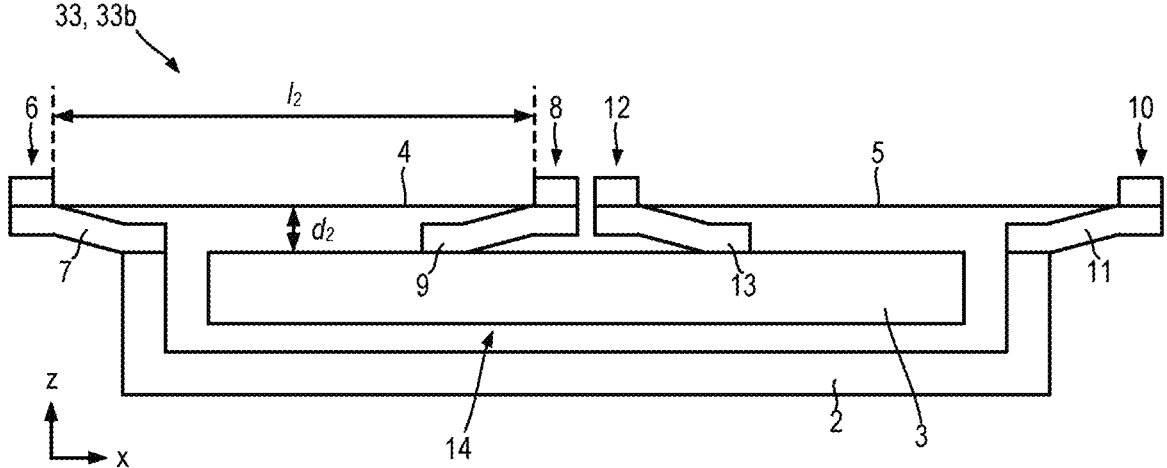

Referring also to FIG. 9A, a third SMA actuator 33 is shown. Referring also to FIG. 9B, a second configuration 33*b* of the third SMA actuator 33 is shown in which a tension T of the first and second segments of SMA wire 4, 5 has been relaxed without a net displacement δx.

In the first SMA actuator 1, the spring feature of the first and second resilient elements 7, 9 is outside the length l of the first segment of SMA wire 4, and similarly for the second segment of SMA wire 5 and corresponding resilient elements 11, 13. This configuration may result in an increased size of the first SMA actuator 1 and/or a reduction in the range of motion $x_0 \pm \Delta x$, because the maximum possible change δl in length (second distance) is related to the natural, unstrained length of a segment of SMA wire 4, 5, 18, 19 (in e.g. the twinned martensitic phase as a reference point).

The third SMA actuator 33 aims to address these issues by rotating each of the first to fourth resilient elements 7, 9, 11, 13 by 180 degrees so that the respective spring features are within the length l of the first or second segments of SMA wire 4, 5. The third SMA actuator 33 is an example of a general SMA actuator 16.

Referring in particular to FIG. 9A, the central configuration $x_0$ is shown, in which the first and second segments of SMA wire 4, 5 are pre-stressed with a tension T. Referring in particular to FIG. 9B, if the tension T is allowed to relax (by reducing the drive currents $I_1$, $I_2$), the first and second segments of SMA wire 4, 5 extend from $l_1$ to $l_2$, whilst first to fourth resilient elements 7, 9, 11, 13 relax towards unstrained configurations and in doing so reduce the first distance from $d_2$ to $d_2$.

Although the third SMA actuator 33 is shown as a modification of the SMA actuator 1, the second SMA actuator 28 may equally be modified so that the deformations of the fifth to eighth resilient elements 29, 30, 31, 32 occur within the lengths l of the respective first or second segments of SMA wire 4, 5.

Although illustrated in FIGS. 9A and 9B using first to fourth resilient elements 7, 9, 11, 13 in the form of sprung crimps, as described hereinbefore with relation to the SMA actuator 1 and second SMA actuator, any resilient elements suitable for providing the described functions may be substituted. In particular, any resilient elements which may be configured to accommodate deformation within the length l of a respective segment of SMA wire 4, 5, 18, 19.

Although the third SMA actuator 33 is illustrated including first and second segments of SMA wire 4, 5, a general SMA actuator 16 may include up to a number N of segments of SMA wire 4, 5, 18, 19. Each segment of SMA wire 4, 5, 18, 19 in a general SMA actuator 16 may be configured in the same way as the first and second segments of SMA wire 4, 5 of the third SMA actuator 33.

Fourth SMA Actuator

In the first to third SMA actuators 1, 28, 33, first and second segments of SMA wire 4, 5 have been configured using resilient elements 7, 9, 11, 13, 29 to 32 in order to increase or decrease a first distance d from a heat sink in the form of the second part 3. In other examples, the relevant heat sink could be provided by the first part 2, or may be mounted on or integrated with either of the first or second parts 2, 3.

Such motion towards/away from a single heat sink may provide increased cooling rates at only one extreme of tension T. However, actuators may be designed so that motion away from a first heat sink is also motion towards a second heat sink.

Figure 10A:
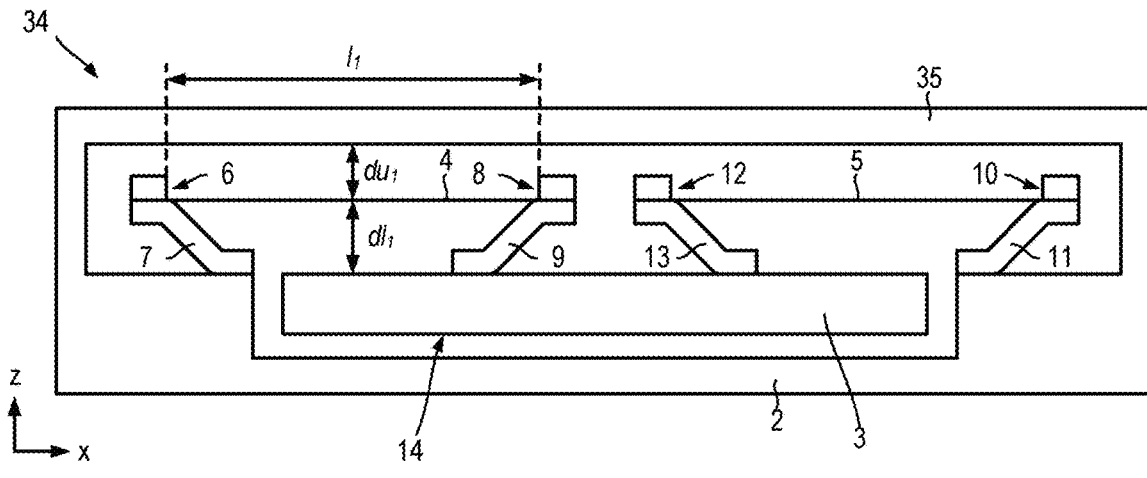
FIGS. 10A to 10C schematically illustrate a fourth SMA actuator.
Figure 10B:
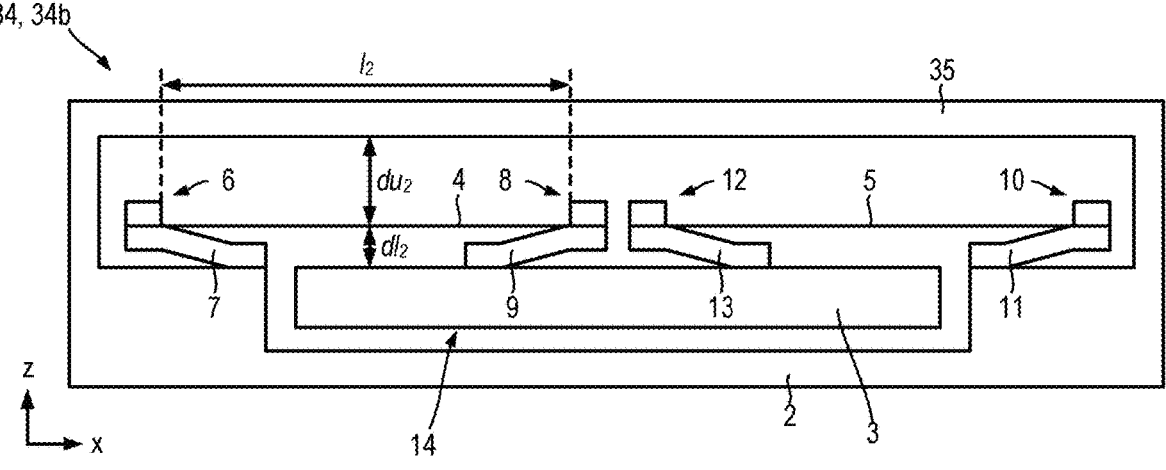
Figure 10C:
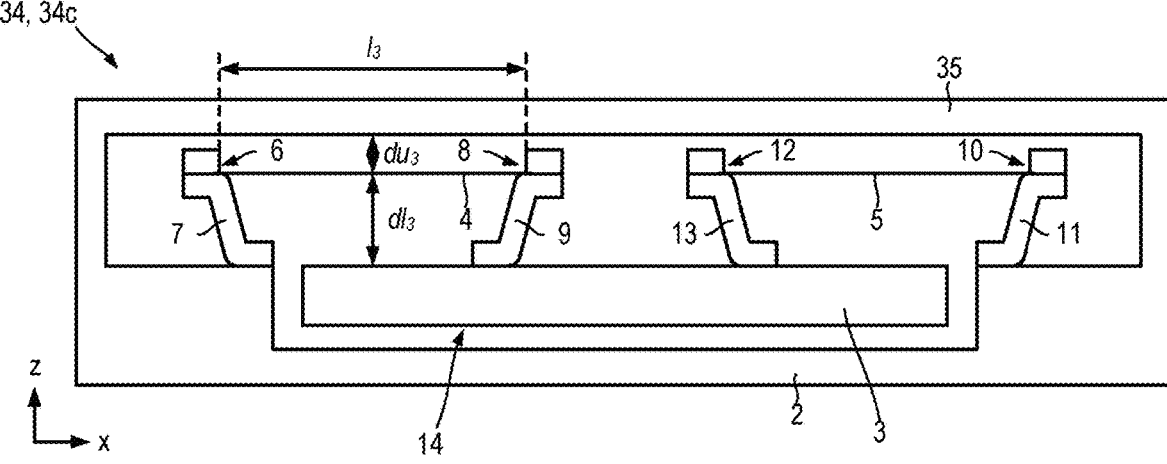

Referring also to FIGS. 10A to 10C, a fourth SMA actuator 34 is shown.

The fourth SMA actuator 34 is the same as the third actuator 33, except that an upper portion 35 extends from the first part 2 to pass above the first and second segments of SMA wire 4, 5. The upper portion 35 may be integrally formed as a portion of the first part 2, or may be a separate element which is attached or fixed to the first part 2 in any way such that the upper portion 35 does not move relative to the first part 2. The second part 3 provides a first heat sink, and the upper portion 35 which moves with the first part 2 provides a second heat sink. The segments of SMA wire 4, 5 are positioned between the second part 3 and the upper portion 35.

The fourth SMA actuator 34 is configured so that both high and low tension T in the opposed first and second segments of SMA wire 4, 5 will cause those portions of SMA wire 4, 5 to move closer to, or come into contact with, at least one heat sink.

Referring in particular to FIG. 10A, in a central configuration $x_0$, the first and second segments of SMA wire 4, 5 have a length $l_1$. The segments of SMA wire 4, 5 are tensioned by each other and the respective resilient elements 7, 9, 11, 13 to a tension T. The tension T is maintained using drive currents $I_1$, $I_2$ to control the lengths $l_2$ of the first and second segments of SMA wire 4, 5. In the central configuration $x_0$, the first segment of SMA wire 4 is a first lower distance $dl_1$ from the first heat sink provided by the second part 3, and a first upper distance $du_1$ from the second heat sink provided by the upper portion 35. The second segment of SMA wire 5 is similarly configured to the first segment of SMA wire 4.

Referring in particular to FIG. 10B, a second configuration 34$b$ of the fourth SMA actuator 34 is shown. In the second configuration 34$b$, the fourth actuator 34 remains in the central configuration $x_0$, but the tension T is allowed to relax by reducing the drive currents $I_1$, $I_2$ (and hence temperatures) so that the first and second segments of SMA wire 4, 5 may extend by an amount δl, to $l_2 = l_1 + \delta l$. Consequently the elastic deformation of the resilient elements 7, 9, 11, 13 will also relax, allowing the first and second segments of SMA wire 4, 5 to move closer to the first heat sink provided by the second part 3 and further from the second heat sink provided by the upper portion 35. A change of δd will result in the first lower distance becoming $dl_2 = dl_1 - \delta d$, whilst the first upper distance becomes $du_2 = du_1 + \delta d$.

Referring in particular to FIG. 10C, a third configuration 34$c$ of the fourth SMA actuator 34 is shown. In the third configuration 34$c$, the fourth actuator 34 remains in the central configuration $x_0$, but the tension T is increased by increasing the drive currents $I_1$, $I_2$ (and hence temperatures) so that the first and second segments of SMA wire 4, 5 contract by an amount δl, to $l_3 = l_1 - \delta l$.

Consequently the elastic deformation of the resilient elements 7, 9, 11, 13 will also increase, causing the first and second segments of SMA wire 4, 5 to move further from the first heat sink provided by the second part 3 and closer to the second heat sink provided by the upper portion 35. A change of δd will result in the first lower distance becoming $dl_3 = dl_2 + \delta d$, whilst the first upper distance becomes $du_3 = du_1 - \delta d$.

In the same way as the first to third SMA actuators 1, 28, 33, the tension T of the first and second segments of SMA wire 4, 5 may be varied independently of a displacement δx between the first and second parts 2, 3 of the fourth actuator 34, at least over a part of the range of motion $x_0 \pm \Delta x$.

Although the fourth SMA actuator 34 is illustrated including first and second segments of SMA wire 4, 5, a general SMA actuator 16 may include up to a number N of segments of SMA wire 4, 5, 18, 19. Each segment of SMA wire 4, 5, 18, 19 in a general SMA actuator 16 may be configured in the same way as the first and second segments of SMA wire 4, 5 of the fourth SMA actuator 34. In this way, a segment of SMA wire 4, 5, 18, 19 may be located between a pair of heat sinks in order that any change in tension T may provide an increased cooling rate.

Fifth SMA Actuator

The first to fourth SMA actuators 1, 28, 33, 34 have included first and second segments of SMA wire 4, 5 which are connected at both first 6, 10 and second 8, 12 ends via resilient elements 7, 9, 11, 13, 29 to 32. However, a general actuator 16 may include segments of SMA wire 4, 5, 18, 19 which are connected via a single resilient element 7, 9, 11, 13, 29 to 32.

Figures 11A, 11B, 12, 13:
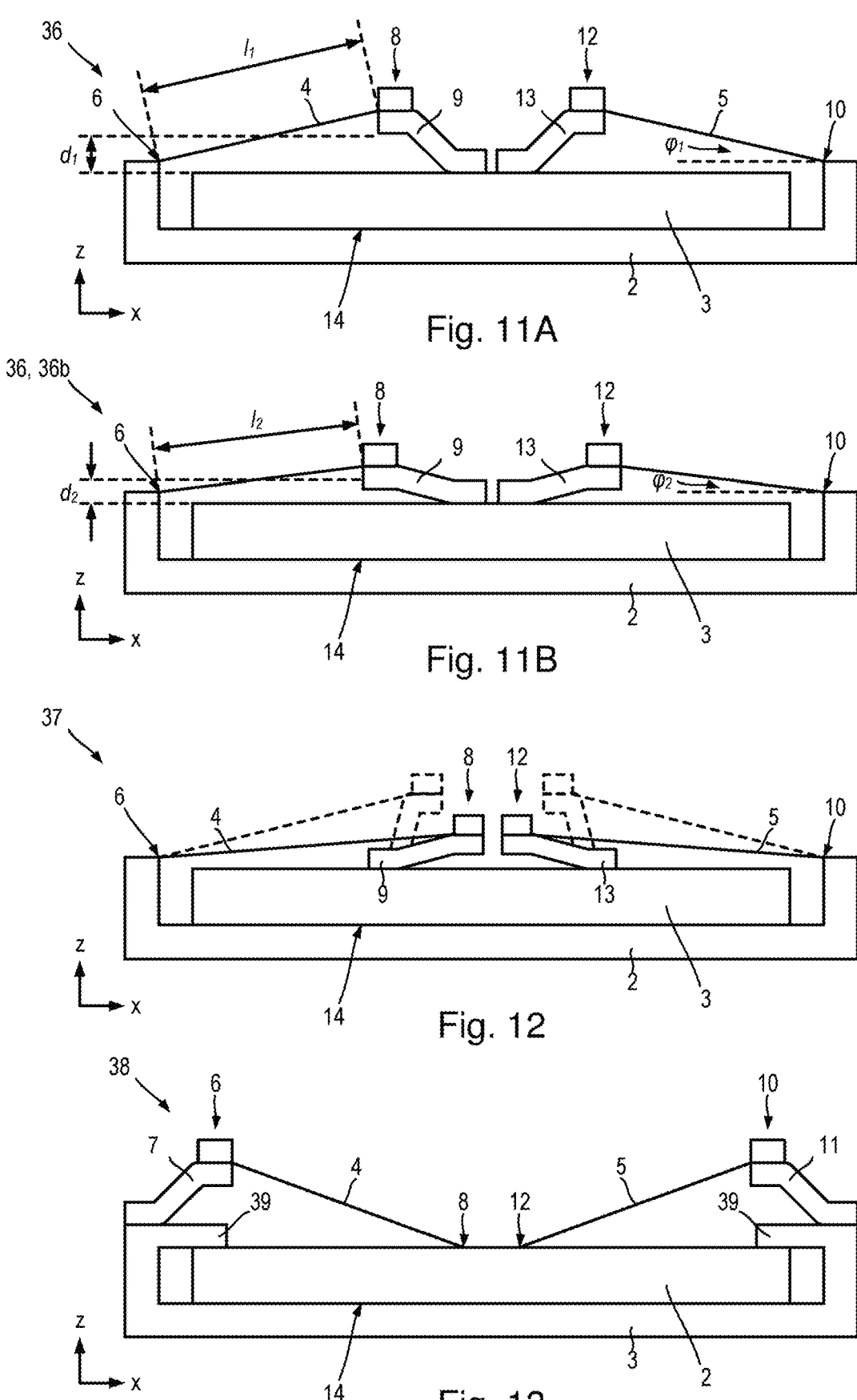
FIGS. 11A and 11B schematically illustrate a fifth SMA actuator.
FIG. 12 schematically illustrates a sixth SMA actuator.
FIG. 13 schematically illustrates a seventh SMA actuator.

Referring also to FIG. 11A, a fifth SMA actuator 36 is shown.

The fifth SMA actuator 36 is the same as the first SMA actuator 1, except that the first and third resilient elements 7, 11 are omitted. The first end 6 of the first segment of SMA wire 4 is directly, or at least rigidly, attached to the first part 2, and the first end 10 of the second segment of SMA wire 5 is directly, or at least rigidly, attached to the first part 2.

In FIG. 11A, the gap 14 is shown as being omitted, with the first and second parts 2, 3 being held in contact by the angles of and tensions in the first and second segments of SMA wire 4, 5. This may sometimes be referred to as a "plain" bearing. However, in variations on the fifth SMA actuator 36, the gap 14 need not be omitted, and any bearing suitable to permit motion parallel to a first direction x or parallel to the plane defined by first x and second y directions may be used instead of a plain bearing. For example, one or more ball or cylinder bearings may be disposed between the first and second parts 2, 3.

In the configuration shown in FIG. 11A, the fifth SMA actuator 36 is in the central configuration $x_0$, the first and second segments of SMA wire 4, 5 have equal lengths $l_1$ and make equal angles $\varphi_1$ to the first direction x. The first and second segments of SMA wire 4, 5 and the second and fourth resilient elements 9, 13 are pre-stressed with a tension T. The first segment of SMA wire 4 is an average first distance of $d_1$ from the heat sink provided by the second part 3. Referring also to FIG. 11B, a second configuration 36b of the fifth SMA actuator 36 is shown.

Without displacing from the central configuration $x_0$, the tension T of the first and second segments of SMA wire 4, 5 is increased by increasing the drive currents $I_1$, $I_2$. The first segment of SMA wire 4 heats up and contracts, changing length (second distance) by an amount $\delta l$ from $l_1$ to $l_2 = l_1 - \delta l$. This causes the second resilient element 9 to bend towards the first end 6, reducing the angle made with the first direction x to $\varphi_2$. This has the effect of reducing the average first distance by an amount $\delta d$ to $d_2 = d_1 - \delta d$. In the example shown in FIGS. 11A and 11B, the change in the average first distance is:

$$\delta d = \frac{1}{2}(l_1 \sin(\varphi_1) - l_2 \sin(\varphi_2)) \tag{3}$$

The second segment of SMA wire 5 and the fourth resilient element 13 are deformed and deflected in a corresponding way to the first segment of SMA wire 4 and second resilient element 7.

In the same way as the first to fourth SMA actuators 1 28, 33, 34, the tension T of the first and second segments of SMA wire 4, 5 may be varied independently of a displacement $\delta x$ of the fifth actuator 36, at least over a part of the range of motion $x_0 \pm \Delta x$.

Although the fifth SMA actuator 36 is illustrated including first and second segments of SMA wire 4, 5, a general SMA actuator 16 may include up to a number N of segments of SMA wire 4, 5, 18, 19. Each segment of SMA wire 4, 5, 18, 19 in a general SMA actuator 16 may be configured in the same way as the first and second segments of SMA wire 4, 5 of the fifth SMA actuator 36.

In an alternative SMA actuator (not shown), the second and fourth resilient actuators 9, 13 may be exchanged for the sixth and eighth resilient actuators 30, 32 configured such that an increase in tension Twill increase the average first distance d of the first and second segments of SMA wire 4, 5 from the heat sink provided by the second part 3.

Sixth SMA Actuator

Referring also to FIG. 12, a sixth SMA actuator 37 is shown.

The sixth SMA actuator 37 is the same as the fifth SMA actuator 36, except that the second and fourth resilient elements 9, 13 have been rotated so that the deformation of the second and fourth resilient elements 9, 13 will be within the length/of the respective first and second segments of SMA wire 4, 5. The differences between the fifth and sixth SMA actuators 36, 37 are generally equivalent to the differences between the first SMA actuator 1 and the third SMA actuator 33, except that increasing tension will increase the average first distance d.

Alternatively and equivalently, the sixth SMA actuator 37 may be considered equivalent to starting with the third SMA actuator 33, then replacing the first and third resilient elements 7, 11 with direct, or at least rigid, connections to the first part 2.

In the same way as the first to fifth SMA actuators 1, 28, 33, 34, 36 the tension T of the first and second segments of SMA wire 4, 5 may be varied independently of a displacement $\delta x$ of the sixth actuator 37, at least over a part of the range of motion $x_0 \pm \Delta x$.

Although the sixth SMA actuator 37 is illustrated including first and second segments of SMA wire 4, 5, a general SMA actuator 16 may include up to a number N of segments of SMA wire 4, 5, 18, 19. Each segment of SMA wire 4, 5, 18, 19 in a general SMA actuator 16 may be configured in the same way as the first and second segments of SMA wire 4, 5 of the sixth SMA actuator 37.

In an alternative SMA actuator (not shown), the second and fourth resilient actuators 9, 13 may be exchanged for the sixth and eighth resilient actuators 30, 32.

Seventh SMA Actuator

The fifth and sixth SMA actuators 36, 37 and non-illustrated variations include a single resilient element 7, 9, 11, 13, 29 to 32 per segment of SMA wire 4, 5, 18, 19, which connects that segment of SMA wire 4, 5, 18, 19 to the second part 3 of an actuator 36, 37. In other examples, a segment of SMA wire 4, 5, 18, 19 may be attached to the second part 3 using a direct, or at least rigid connection, whilst being attached to the first part 2 via a resilient element 7, 9, 11, 13, 29 to 32.

For example, referring also to FIG. 13, a seventh SMA actuator 38 is shown.

The seventh SMA actuator 36 is the same as the first SMA actuator 1, except that the second and fourth resilient elements 9, 13 are omitted. The second end 8 of the first segment of SMA wire 4 is directly, or at least rigidly, attached to the second part 3, and the second end 12 of the second segment of SMA wire 5 is directly, or at least rigidly, attached to the second part 3.

In FIG. 13, the gap 14 is shown as being omitted, with the second part 3 being held in place against one or more retaining lip features 39 by the angles of and tensions in the first and second segments of SMA wire 4, 5. This may sometimes be referred to as a "plain" bearing. However, in variations on the seventh SMA actuator 38, any bearing suitable to permit motion parallel to a first direction x or parallel to the plane defined by first x and second y directions may be used instead of a plain bearing. For example, one or more ball or cylinder bearings may be disposed between the second part 3 and the retaining lip feature(s) 39. Retaining lip feature(s) may be integrally formed with the first part 2, or may be separate from the first part 2 but attached to it in a manner preventing relative motion.

In the same way as the first to sixth SMA actuators 1, 28, 33, 34, 36, 37 the tension T of the first and second segments of SMA wire 4, 5 may be varied independently of a displacement δx of the seventh actuator 38, at least over a part of the range of motion $x_0 \pm \Delta x$.

Although the seventh SMA actuator 38 is illustrated including first and second segments of SMA wire 4, 5, a general SMA actuator 16 may include up to a number N of segments of SMA wire 4, 5, 18, 19. Each segment of SMA wire 4, 5, 18, 19 in a general SMA actuator 16 may be configured in the same way as the first and second segments of SMA wire 4, 5 of the seventh SMA actuator 38.

In an alternative SMA actuator (not shown), the second and fourth resilient elements 9, 13 may be exchanged for the sixth and eighth resilient elements 30, 32.

In further examples (not shown), a segment of SMA wire 4, 5, 18, 19 may be connected at a first end 6, 10 to the first part 2 using either a resilient element 7, 9, 11, 13, 29 to 32 or a direct (rigid) connection, whilst the second end 8, 12 is connected to the second part 3 using either a resilient element 7, 9, 11, 13, 29 to 32 or a direct (rigid) connection.

SMA Wire Vs Spring Actuators

The first to seventh SMA actuators 1, 28, 33, 34, 36, 37, 38 have used a second segment of SMA wire 5 to oppose the contraction of the first segment of SMA wire 4. However, it is not essential to use one or more segments of SMA wire 5, 18, 19 to oppose contraction of the first segment of SMA wire 4. Any of the first to seventh SMA actuators 1, 28, 33, 34, 36, 37, 38 may be adapted to include a resilient biasing element 40 (FIG. 14A), for example a spring, arranged to oppose contraction of the first segment of SMA wire 4 and to tension T the first segment of SMA wire 4. Such actuators may be referred to as "SMA wire-vs-spring" actuators, and represent additional examples of general SMA actuators 16.

An SMA wire-vs-spring actuator loses the capacity to vary tension T of the first segment of SMA wire 4 independently of displacement δx from a central configuration $x_0$. Nonetheless, resilient elements 7, 9, 11, 13, 29 to 32 may be added to SMA wire-vs-spring actuators and configured to provide improvements in cooling rates which depend on the relative displacement δx between first and second parts 2, 3.

Figures 14A, 14B, 14C, 15:
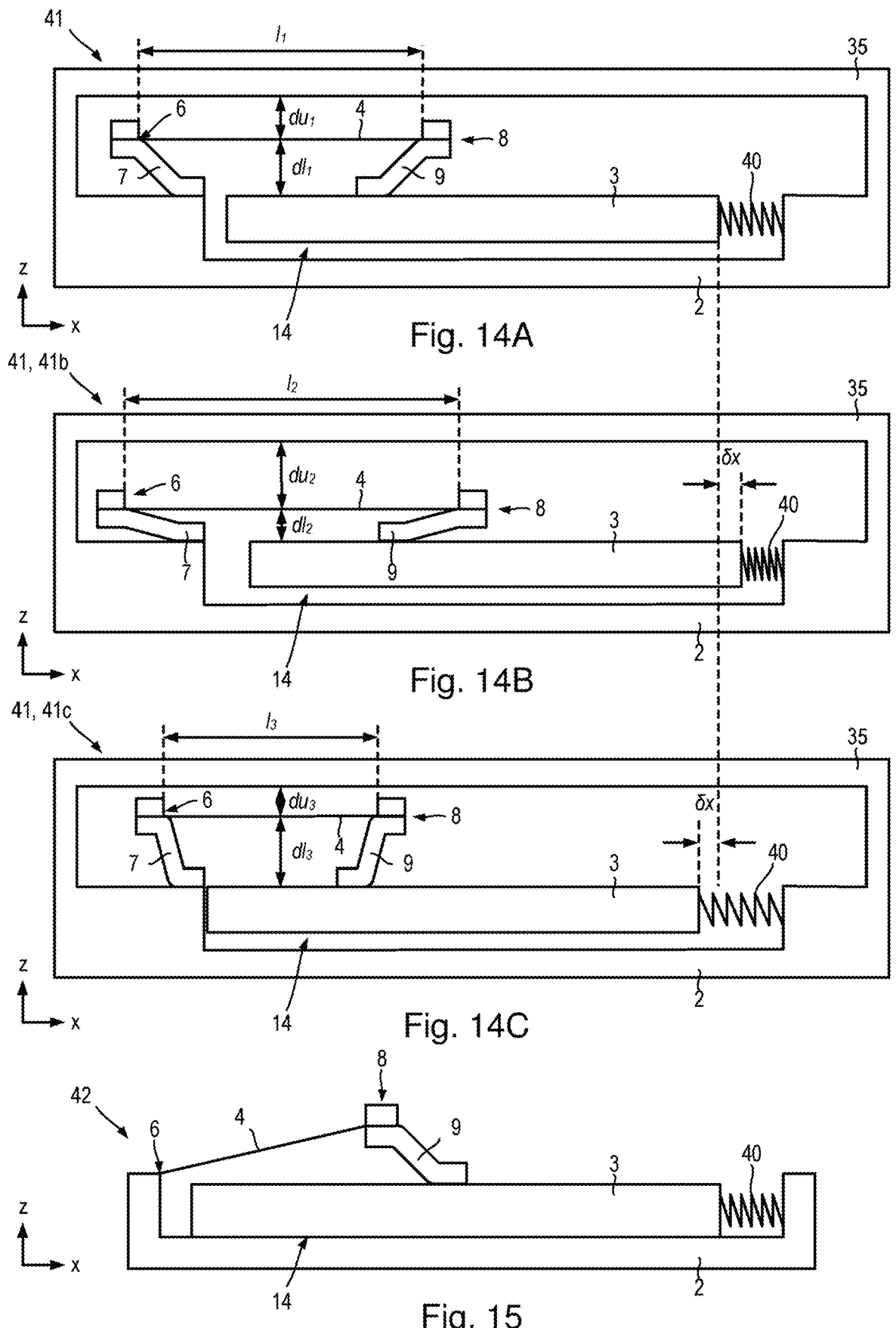
FIGS. 14A to 14C schematically illustrate an eighth SMA actuator.
FIG. 15 schematically illustrates a ninth SMA actuator.

Referring also to FIG. 14A, an eighth SMA actuator 41 is shown in a central (or initial) configuration $x_0$.

The eighth SMA actuator 41 is the same as the fourth SMA actuator 34, except that the second segment of SMA wire 5 and associated resilient elements 11, 13 have been removed, and replaced with a resilient biasing element 40 in the form of a helical spring. The resilient biasing element 40 in the form of a helical spring has a linear (obeying Hooke's law) spring constant of $k_{bias}$. The first segment of SMA wire 4, the first and second resilient elements 7, 9 and the resilient biasing element 40 are pre-stressed with a tension T in the configuration shown in FIG. 14A.

In most ways, the eighth SMA actuator 41 functions similarly to the fourth SMA actuator 34, the notable difference being that changing the tension T of the first segment of SMA wire 4 necessarily also results in a displacement δx between first and second parts 2, 3 of the eighth SMA actuator 41.

For example, referring also to FIG. 14B, a second configuration 41b of the eighth SMA actuator 41 is shown.

In the second configuration 41b, the tension T in the first segment of SMA wire 4 has been allowed to drop by reducing the drive current $I_1$ (and temperature) to allow the first segment of SMA wire 4 to be extended until a new equilibrium with the resilient biasing element 40 is reached. The tension T drops by an amount $\delta T = k_{bias}\delta x$ related to the displacement δx of the eighth SMA actuator 41 by the spring constant $k_{bias}$ of the resilient biasing element 40. The first and second resilient elements 7, 9 also relax towards an unstrained state, and as described hereinbefore are configured to cause to the first segment of SMA wire 4 to move towards the first heat sink provided by the second part 3 and away from the second heat sink provided by the upper portion 35 by an amount $\delta d = dl_1 - dl_2 = du_2 - du_1$. It should be noted that the change in length $\delta l = l_1 - l_2$ will be slightly greater than the displacement δx, since some of the change in length δl is accommodated by relaxation of the first and second resilient elements 7, 9. Referring also to FIG. 14C, a third configuration 41c of the eighth SMA actuator 41 is shown.

In the third configuration 41c, the tension T in the first segment of SMA wire 4 has been increased by increasing the drive current $I_1$ (and temperature) so that the first segment of SMA wire 4 contracts until a new equilibrium with the resilient biasing element 40 is reached. The tension T is increased by an amount $\delta T = k_{bias}\delta x$ related to the displacement δx of the eighth SMA actuator 41 by the spring constant $k_{bias}$ of the resilient biasing element 40. The first and second resilient elements 7, 9 also deform upwards and inwards towards the upper portion 35 and one another. Consequently the first segment of SMA wire 4 is caused to move away from the first heat sink provided by the second part 3 and towards the second heat sink provided by the upper portion 35 by an amount $\delta d = dl_3 - dl_2 = du_1 - du_3$. It should be noted that the change in length $\delta l = l_3 - l_2$ will be slightly greater than the displacement δx, since some of the change in length δl is accommodated by bending of the first and second resilient elements 7, 9.

In this way, as the eighth SMA actuator 41 approaches either extreme of the range of motion $x_0 \pm \Delta x$, the first segment of SMA wire is brought closer to either the first or second heat sink (second part 3 or upper portion 35), increasing cooling rates and improving responsivity.

Although shown in FIGS. 14A to 14C as a helical spring, the resilient biasing element 40 may be replaced using any biasing element capable of applying tension T to oppose contraction of the first segment of SMA wire 4. For example, the resilient biasing element 40 may take the form of a leaf spring, a carriage spring, a flexure, a region of resilient material such as natural or synthetic rubber, or any other resilient biasing element capable of providing the hereinbefore described functions.

Ninth SMA Actuator

Any of the first to seventh SMA actuators 1, 28, 33, 34, 36, 37, 38 may be adapted to operate as a wire-vs-spring actuator, instead of using a second segment of SMA wire 5 to oppose contraction of the first segment of SMA wire 4. For example, referring also to FIG. 15, a ninth SMA actuator 42 is shown.

The ninth SMA actuator is the same as the fifth SMA actuator 36, except that the second segment of SMA wire 5 is omitted, and the contraction of the first segment of SMA wire 4 is instead opposed by a resilient biasing element 40 in the form of a helical spring.

Displacements of SMA Wire Segment Ends

Figure 16A:
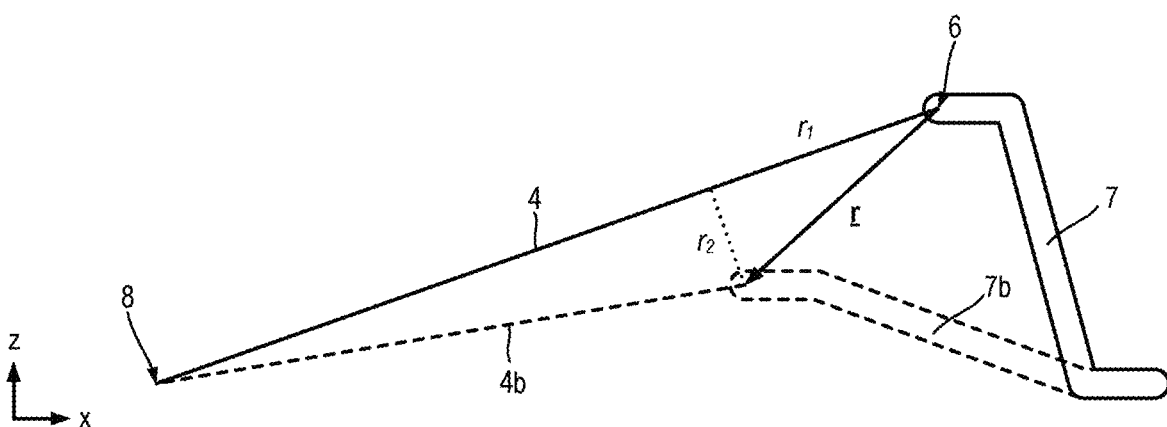
FIGS. 16A to 16C illustrate displacements of a segment of SMA wire connected to resilient biasing elements at one or both ends.

Referring also to FIG. 16A, a schematic is shown of actuating a first segment of SMA wire 4 having the second end 8 fixed and the first end 6 connected via a first resilient element 7.

The initial configuration is shown with solid lines, whilst the final configuration after increasing tension T of the first segment of SMA wire 4 is shown using dashed lines and reference numerals 4b, 7b.

The overall displacement of the first end 6 is described by a vector r, which includes a first displacement $r_1$ towards the second end 8, and a second displacement $r_2$ perpendicular to the first displacement $r_1$. The first displacement $r_1$ corresponds to a distance moved in a direction parallel to the first segment of SMA wire 4 before the change in tension T, and the second displacement $r_2$ corresponds to a direction perpendicular to the first segment of SMA wire 4 before the change in tension T.

An alternative expression of the functionality of the first resilient element 7 is that in response to a change in tension T of the first segment of SMA wire 4 the first end 6 should be moved by a second displacement $r_2$ which is greater than the first displacement $r_1$. Note that this condition is not satisfied by the example shown in FIG. 16A (or FIGS. 16B, 16C), the relative displacements of which have been exaggerated for visual purposes. This functionality is equally true for any suitable resilient element 7, 9, 11, 13, 29 to 32.

Figure 16B:
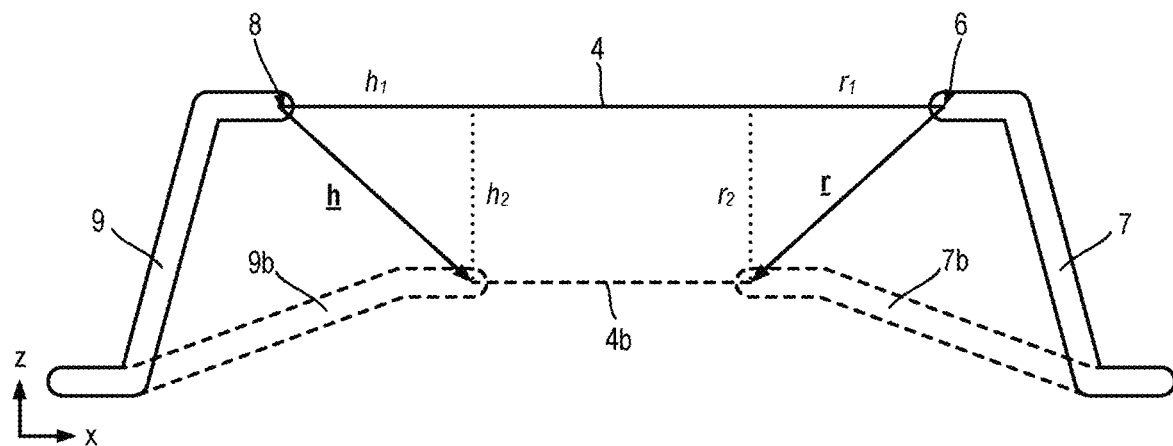

Referring also to FIG. 16B, a schematic is shown of actuating a first segment of SMA wire 4 having the first end 6 connected via a first resilient element 7 and the second end 8 connected via a second resilient element 9.

The initial configuration is shown with solid lines, whilst the final configuration after increasing tension T of the first segment of SMA wire 4 is shown using dashed lines and reference numerals 4b, 7b, 9b.

The overall displacement of the second end 8 is described by a vector h, which includes a third displacement $h_1$ towards the first end 6, and a fourth displacement $h_2$ perpendicular to the third displacement $h_1$. The third displacement $h_1$ corresponds to a distance moved in a direction parallel to the first segment of SMA wire 4 before the change in tension T, and the fourth displacement $h_2$ corresponds to a direction perpendicular to the first segment of SMA wire 4 before the change in tension T. In response to a change in tension T of the first segment of SMA wire 4, the second end 8 should be moved by a fourth displacement $h_2$ which is greater than the third displacement $h_1$. This functionality is equally true for any suitable resilient element 7, 9, 11, 13, 29 to 32.

The second and fourth displacements $r_2$, $h_2$ need not be in the same direction. For example, referring also to FIG. 16C, a schematic is shown of actuating a first segment of SMA wire 4 having the first end 6 connected via a first resilient element 7 and the second end 8 connected via a second resilient element 9.

Figure 16C:
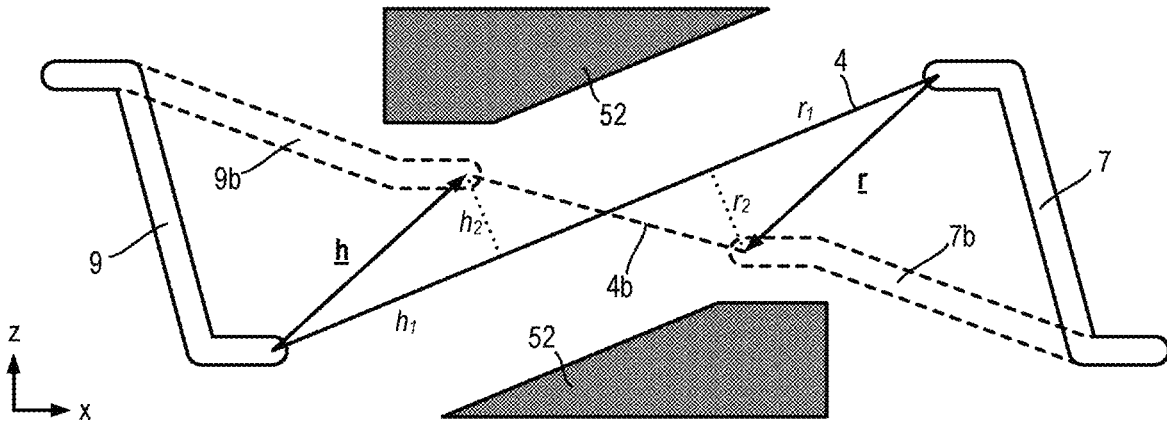

The configuration of FIG. 16C differs from that of FIG. 16B in that the second resilient element 9 has been flipped (mirrored) about an axis parallel to the first direction x. The initial configuration is shown with solid lines, whilst the final configuration after increasing tension T of the first segment of SMA wire 4 is shown using dashed lines and reference numerals 4b, 7b, 9b.

In this configuration, the fourth displacement $h_2$ is in the opposite direction (anti-parallel) to the second displacement $r_2$. Such a configuration may still be useful for controlling the separation (and therefore cooling rate) of the first segment of SMA wire 4. An example of a pair of heat sinks 52 configured to provide a variable average distance with respect to the first segment of SMA wire 4 are also shown in FIG. 16C.

Figure 17:
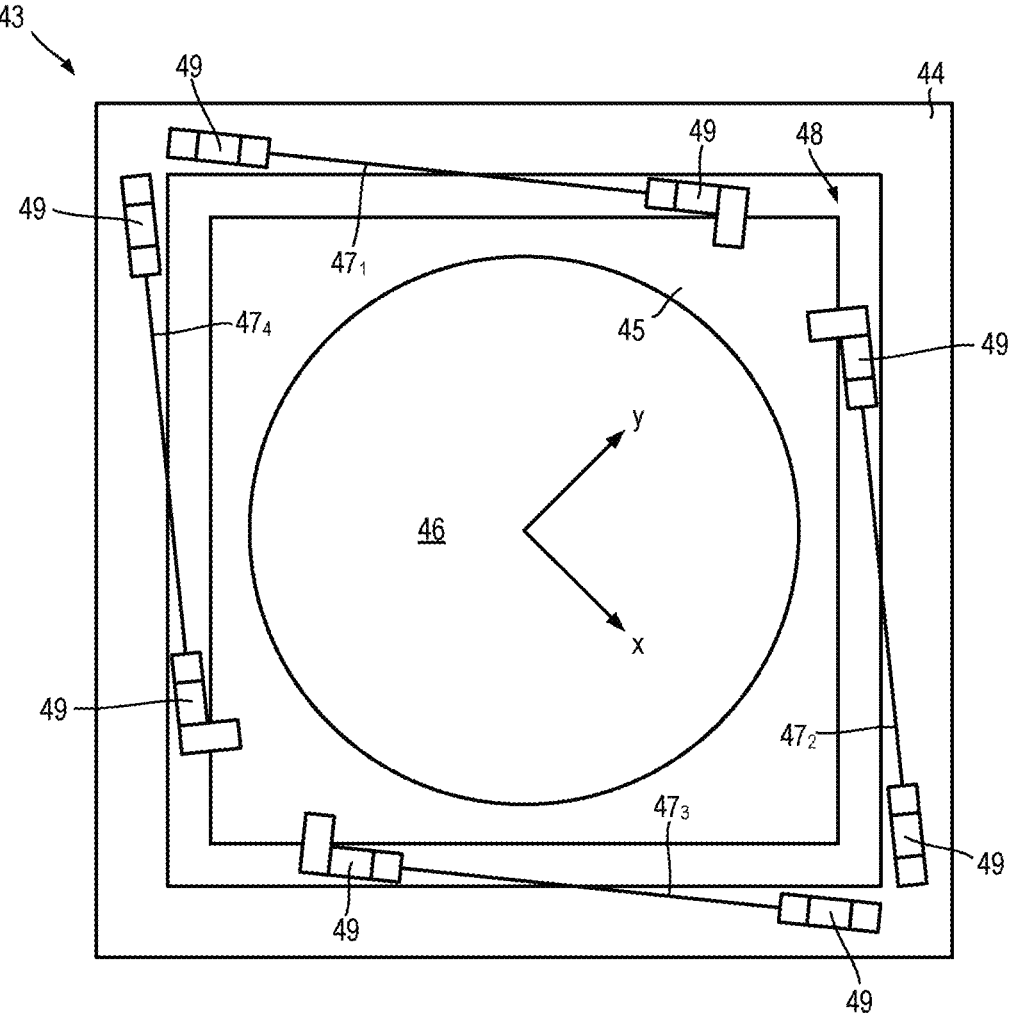
FIG. 17 schematically illustrates an optical image stabilisation (OIS) assembly.

SMA optical image stabilisation assembly Referring also to FIG. 17, an optical image stabilisation (OIS) assembly 43 for a camera is shown.

The OIS assembly 43 includes a first part 2 in the form of a support platform 44 and a second part 3 in the form of a lens carriage 45. The lens carriage 45 includes an annular aperture within which a lens 46 is supported. The OIS assembly 43 is configured to allow movement of the lens carriage 45 and the supported lens 46 laterally in the plane defined by first x and second y directions (in other words, by first x and second y axes), as well as rotation of the lens carriage 45 about the third direction z (in other words, the third axis z). The third direction z is the optical axis of the lens 46. The lens 46 focusses an image onto an image sensor (not shown), and additional lenses (not shown) may be positioned above and/or below the lens 46 in the third direction z.

The lens carriage 45 is coupled to the support platform using four segments of SMA wire $47_1$, $47_2$, $47_3$, $47_4$, arranged to form a lateral actuation arrangement.

Examples of lateral actuation arrangements including four SMA wires are described in WO 2017/055788 A1 and WO 2019/086855 A1, which are incorporated herein by this reference.

In operation, the segments of SMA wire $47_1$, $47_2$, $47_3$, $47_4$ are selectively driven to move the lens carriage 45 relative to the support platform 44 in any lateral direction (i.e., a direction perpendicular to the third direction z and optical axis (within the plane of the first and second directions x, y). Further explanations are also provided in WO 2013/175197 A1, which is incorporated herein by this reference.

The segments of SMA wire $47_1$, $47_2$, $47_3$, $47_4$ have an arrangement in a loop at different angular positions around the lens 46 to provide two pairs of opposed segments of SMA wire $47_1$, $47_2$, $47_3$, $47_4$ that are perpendicular to each other.

The four segments of SMA wire $47_1$, $47_2$, $47_3$, $47_4$ form a pair $47_1$, $47_4$ which oppose the pair $47_2$, $47_3$ along the first direction x, whilst the pair $47_1$, $47_2$ oppose the pair $47_3$, $47_4$ along the second direction y. Thus, each pair of opposed segments of SMA wire $47_1$, $47_2$, $47_3$, $47_4$ is capable on selective driving of moving the lens carriage 45 and supported lens 46 in one of two perpendicular directions in the plane containing the first and second directions x, y. As a result, the segments of SMA wire $47_1$, $47_2$, $47_3$, $47_4$ are capable of being selectively driven to move the lens carriage 45 relative to the support platform 44 to any position within a range of movement $x_0 \pm \Delta x$, $y_0 \pm \Delta y$ in the plane of the first and second directions x, y. The magnitude of the range of movement $x_0 \pm \Delta x$, $y_0 \pm \Delta y$ depends on the geometry and the range of contraction of the segments of SMA wire $47_1$, $47_2$, $47_3$, $47_4$ within their normal operating parameters.

Since the segments of SMA wire $47_1$, $47_2$, $47_3$, $47_4$ form opposing pairs, the methods of actively influencing cooling rates described hereinbefore may be applied to the OIS assembly 43.

The drive signals for the segments of SMA wire $47_1$, $47_2$, $47_3$, $47_4$ may be generated and supplied by a controller 17 including a current driver module 24 including at least four outputs (FIG. 2). Under control of a process executed by the processor 20, the drive currents $I_1$, $I_2$, $I_3$, $I_4$ are generated by the current driver module 24 in response to output signals of a gyroscope sensor included in the sensors 22 (FIG. 2) so as to drive movement of the OIS assembly 43 to stabilise an image focused by the lens 46 on an image sensor (not shown), thereby providing OIS. The drive currents $I_1$, $I_2$, $I_3$, $I_4$ may be generated using a resistance feedback control technique for example as described in WO 2014/076463 A1, which is incorporated herein by this reference.

In operation, the lens carriage 45 is moved orthogonally to the optical axis (in the x-y plane), relative to an image sensor (not shown) offset with respect to the lens 46 in the third direction z, with the effect that an image on the image sensor (not shown) is moved. This may be used to provide optical image stabilization (OIS) by compensating for movement of the camera incorporating the OIS assembly 43, which may be caused by hand shake etc.

In some examples, additional components such as springs, flexures or similar resilient biasing elements (not shown) may be included in the OIS assembly 43 in order to bias the lens carriage 45 towards a central configuration $x_0$, $y_0$. When such resilient biasing elements (not shown) are included, in the absence of driving of the lateral movement of the OIS assembly 43, the lens carriage 45 will tend towards the central configuration $x_0$, $y_0$ from any position displaced $\delta x$, by relative to the central configuration $x_0$, $y_0$. This may help ensure that a camera incorporating the OIS assembly 43 remains functional to capture images, even in the absence of driving of the segments of SMA wire $47_1$, $47_2$, $47_3$, $47_4$. The magnitude of lateral biasing forces is kept low enough so as not to hinder OIS whilst preferably being high enough to centre the OIS assembly 43 in the absence of driving.

A space 48 is provided between the support platform 44 and the lens carriage 45 to allow a range of motion. End-stops (not shown) may be provided to prevent excessive straining of the segments of SMA wire $47_1$, $47_2$, $47_3$, $47_4$ in the event that a camera incorporating the OIS assembly 43 (or a device including such a camera) experiences an impact, for example by being dropped on the floor. The relative size of the space 48 is exaggerated in FIG. 17 for visual purposes.

The difference between the OIS assembly 43 and previous OIS assemblies including four SMA wires is that each of the four segments of SMA wire $47_1$, $47_2$, $47_3$, $47_4$ are connected between the support platform 44 and the lens carriage 45 using a pair of resilient elements 49 at either end. The resilient element 49 are configured as described hereinbefore, so that the segments of SMA wire $47_1$, $47_2$, $47_3$, $47_4$ may be translated in the third direction z (i.e. perpendicular to the x-y plane) as the tensions T of the segments of SMA wire $47_1$, $47_2$, $47_3$, $47_4$ are increased and decreased. A heat sink may be provided by, for example, the structure of the support platform 44, or by a further structure arranged above the segments of SMA wire $47_1$, $47_2$, $47_3$, $47_4$ in the third direction z.

However, resilient elements 49 according to this specification are not restricted to providing displacements of segments of SMA wire $47_1$, $47_2$, $47_3$, $47_4$ in a direction perpendicular to a plane of motion of a general SMA actuator 16.

Figure 18:
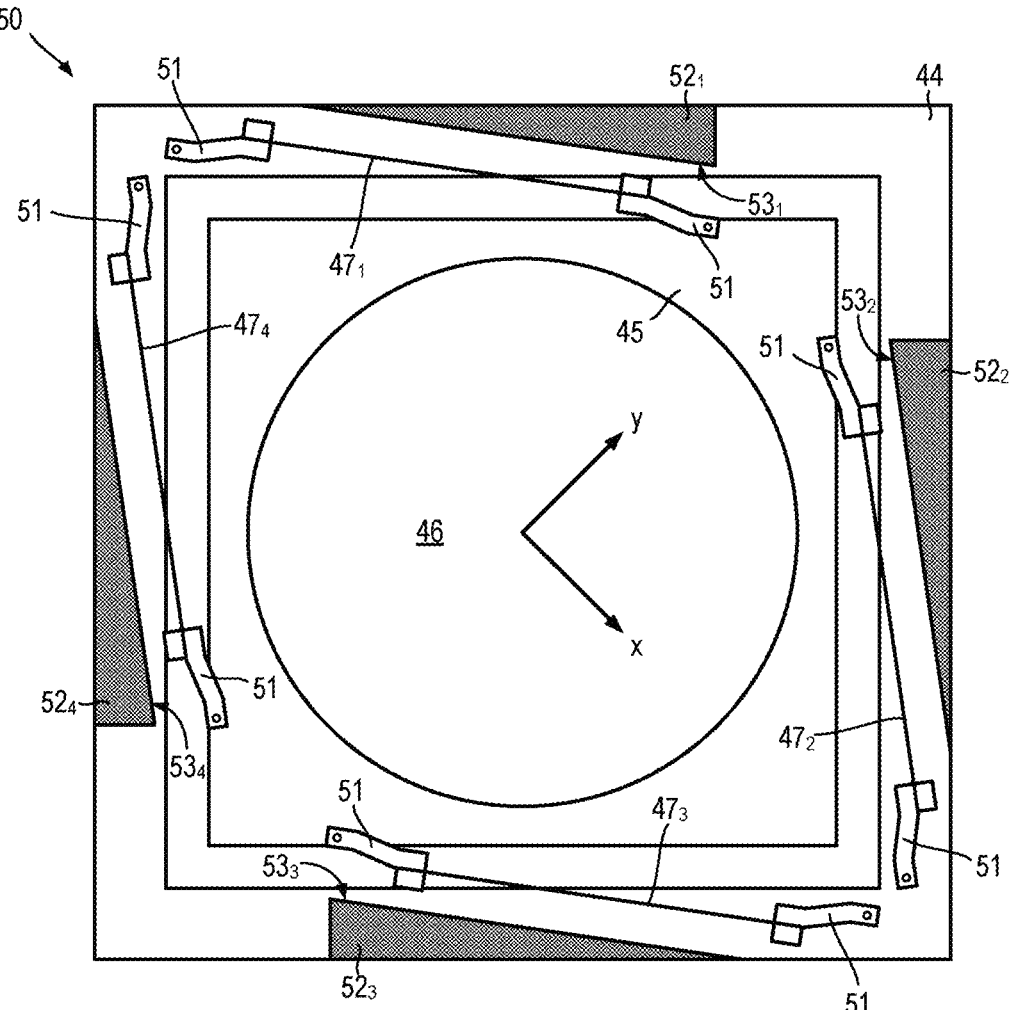
FIG. 18 schematically illustrates a second OIS assembly.

For example, referring also to FIG. 18, a second OIS assembly 50 is shown. The second OIS assembly 50 is the same as the first OIS assembly 43, except that the resilient elements 49 are replaced by in-plane resilient elements 51.

The in-plane resilient elements 51 are connected at one end to the support platform 44 or lens carriage 45, and at the other to one of the four segments of SMA wire $47_1$, $47_2$, $47_3$, $47_4$. The connections of in-plane resilient elements 51 to the support platform 44 or lens carriage 45 may be fixed, or free to rotate, for example using a pin-joint as illustrated in FIG. 18. Unlike the resilient elements 49, the in-plane resilient elements 51 do not cause the segments of SMA wire $47_1$, $47_2$, $47_3$, $47_4$ to move towards and away from the support platform 44 and lens carriage in the third direction z.

Instead, the in-plane resilient elements 51 are configured to displace the segments of SMA wire $47_1$, $47_2$, $47_3$, $47_4$ within the plane of the first and second directions x, y, so as to move nearer to, or further from, corresponding heat sinks $52_1$, $52_2$, $52_3$, $52_4$. The heat sinks $52_1$, $52_2$, $52_3$, $52_4$ may be extensions of the support platform 44, or may be separate structures bonded or mounted to the support platform 44. Preferably the heat sinks $52_1$, $52_2$, $52_3$, $52_4$ will have relatively high thermal conductance, for example by being formed of a metallic material such as stainless steel. The heat sinks $52_1$, $52_2$, $52_3$, $52_4$ are arranged proximate to the respective segments of SMA wire $47_1$, $47_2$, $47_3$, $47_4$, and each includes a principal surface $53_1$, $53_2$, $53_3$, $53_4$ running substantially parallel to the closest segment of SMA wire $47_1$, $47_2$, $47_3$, $47_4$.

The arrangement of in-plane SMA wire segment $47_1$, $47_2$, $47_3$, $47_4$ displacements in the second OIS assembly 50 may permit greater control over the precise positioning of heat sinks $52_1$, $52_2$, $52_3$, $52_4$ when compared to using the structures of the support platform 44 and/or lens carriage 45 to provide heat sinks. Additionally, the in-plane SMA wire segment $47_1$, $47_2$, $47_3$, $47_4$ displacements may help to keep the device dimensions low in the third direction (parallel to the optical axis of the lens 46).

Other Variations

It will be appreciated that there may be many other variations of the above-described embodiments.

The SMA actuators 1, 28, 33, 34, 36, 37, 38, 41, 42, 43, 50 described hereinbefore have been illustrated using resilient elements 7, 9, 11, 13, 29 to 32, 49, 51 in the form of sprung crimps. However, any resilient element 7, 9, 11, 13, 29 to 32, 49, 51, in any SMA actuator 1, 28, 33, 34, 36, 37, 38, 41, 42, 43, 50 may be replaced using any other structure suitable to provide the functions described hereinbefore. For example, resilient elements may be provided by any type of spring, by flexures or arms formed from metallic or polymeric materials, by structures formed from resilient elastomeric materials, and so forth.

Wire-vs-spring SMA actuators 40, 42 have been shown including separate resilient biasing elements 40 in the form of helical springs. However, wire-vs-spring SMA actuators 40, 42 are not limited to helical springs, and any other type of resilient biasing structures suitable for opposing a segment of SMA wire may be used. For example, leaf springs, carriage springs, flexures or arms formed from metallic or polymeric materials, structures formed from resilient elastomeric materials, and so forth. A resilient biasing element may be integrally formed as part of the first and/or second parts 2, 3, for example as a stainless-steel flexure extending from the first part 2.

Although not shown in the drawings, the second part 3 of any of the SMA actuators 1, 28, 33, 34, 36, 37, 38, 41, 42, 43, 50 may be provided with end stops (not shown) to provide limits on lateral movement of the second part 3 relative to the first part 2. In this way the segments of SMA wires 4, 5, 18, 19, $47_1$, $47_2$, $47_3$, $47_4$ can protected against impacts.

Although the SMA actuators 1, 28, 33, 34, 36, 37, 38, 41, 42, 43, 50 described hereinbefore are limited to motion in the plane of the first and second directions x, y, the same principles of using resilient elements 7, 9, 11, 13, 29 to 32, 49, 51 to control cooling rates based on separation from one or more heat sinks may be applied to a general SMA actuator 16 providing motion in any translational directions x, y, z and/or rotation about any direction x, y, z.

Whilst the preceding description has been presented with reference to first, second and third directions x, y, z providing a right-handed orthogonal Cartesian coordinate system, the invention is not limited by the coordinate system used to describe it.

The OIS assemblies 43, 50 need not be configured to support a lens 46 and, for example, may be configured to support another type of optical element, an image sensor, an entire camera module, and so forth. The OIS assemblies 43, 50 need not be used in a camera.

The SMA actuators 1, 15, 28, 33, 34, 36, 37, 38, 41, 42, 43, 50 described hereinbefore may be used in any type of assembly that comprises a first part and a second part movable with respect to the first part.

The first part 2 may be a support structure. The second part 3 may be a movable part.

It will be appreciated that any of the embodiments shown in FIGS. 1A-1C, 8A-8B, 9A-9B, 10A-10C, 11A-11B, 12, 13 (or any other similar embodiments) may be provided with the resilient biasing element 40 of FIGS. 14A-14C, 15 (or any similar resilient biasing element).

It will be appreciated that any of the embodiments shown in FIGS. 14A-14C, 15 (or any other similar embodiments) may be provided with the second segment of SMA wire 5 and the resilient elements connected to the second segment of the SMA wire 5 of FIGS. 1A-1C, 8A-8B, 9A-9B, 10A-10C, 11A-11B, 12, 13 (or any other similar components).

The above-described SMA actuator assemblies comprise an SMA wire. The term 'shape memory alloy (SMA) wire' may refer to any element comprising SMA. The SMA wire may have any shape that is suitable for the purposes described herein.

The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The invention claimed is:

1. An apparatus comprising:

a shape memory alloy actuator comprising:
  a first part;
  a second part;
  one or more heat sinks;
  one or more shape memory alloy wires comprising a first segment of shape memory alloy wire, wherein:
    the one or more shape memory alloy wires are configured to move the second part relative to the first part over a range of movement;
    the one or more shape memory alloy wires include the first segment of shape memory alloy wire and a second segment of shape memory alloy wire;
    the first segment of shape memory alloy wire is connected to the first part by a first resilient element at a first end, and a second end of the first segment of shape memory alloy wire is connected to the second part;
    the second segment of shape memory alloy wire is configured to oppose the first segment of shape memory alloy wire;
    tension of the first and second segments of shape memory alloy wire are variable independently of the position of the second part over at least a portion of the range of movement;
    the first resilient element is configured such that in response to a change in tension of the first segment of shape memory alloy wire, a first distance between the first segment of shape memory alloy wire and at least one of the heat sinks is increased or decreased by an amount greater than a change in a second distance between the first and second ends; and
  a controller configured to:
    control the relative positions of the first part and the second part; and
    control a cooling rate of the first segment of shape memory alloy wire by adjusting the tension of the first segment of shape memory alloy wire, wherein:
      moving the first segment of shape memory alloy wire towards at least one of the heat sinks increases the cooling rate; and
      moving the first segment of shape memory alloy wire away from at least one of the heat sinks decreases the cooling rate.

2. The apparatus according to claim 1, further comprising:

a temperature sensing module configured to determine a temperature corresponding to the first segment of shape memory alloy wire, wherein the controller is configured to:
  determine the temperature; and
  adjust a distance of the first segment of shape memory alloy wire from at least one of the heat sinks based on the temperature, wherein the adjusting the distance of the first segment of shape memory alloy wire from at least one of the heat sinks based on the temperature comprises:
    (i) retrieving, from a look-up table stored by the controller, a pre- calibrated distance which corresponds to the temperature; or
    (ii) in response to determining an increase in the temperature, reducing the distance of the first segment of shape memory alloy wire from at least one of the heat sinks; in response to determining a decrease in the temperature, increasing the distance of the first segment of shape memory alloy wire from at least one of the heat sinks.

3. The apparatus according to claim 1, wherein the controller is further configured to reduce the distance of the first segment of shape memory alloy wire from at least one of the heat sinks before changing the relative positions of the second part and the first part.

4. The apparatus according to claim 1, wherein the controller is further configured to increase the distance of the first segment of shape memory alloy wire from at least one of the heat sinks after changing the relative positions of the second part and the first part.

5. The apparatus according to claim 1, wherein;

the controller is further configured to adjust a distance of the first segment of shape memory alloy wire from at least one of the heat sinks based on relative position of the second part within the range of movement; and the adjusting the distance of the first segment of shape memory alloy wire from at least one of the heat sinks based on relative position of the second part within the range of movement comprises:

in response to the second part moving closer to a centre of the range of movement, increasing the distance of the first segment of shape memory alloy wire from at least one of the heat sinks; and in response to the second part moving further from the centre of the range of movement, decreasing the distance of the first segment of shape memory alloy wire from at least one of the heat sinks.

6. The apparatus according to claim 1, wherein:

the one or more shape memory alloy wires comprise one or more further segments of shape memory alloy wire, each further segment of shape memory alloy wire being identically configured to the first segment of shape memory alloy wire; and the controller is configured to control each further segment of shape memory alloy wire in the same way as the first segment of shape memory alloy wire.

7. A method of controlling a shape memory alloy actuator, the method comprising:

controlling a cooling rate of a first segment of shape memory alloy wire by adjusting a tension of the first segment of shape memory alloy wire, wherein:

the shape memory alloy wire is part of the shape memory alloy actuator, the shape memory alloy actuator comprising:

a first part;

a second part;

one or more heat sinks; and one or more shape memory alloy wires, comprising the first segment of shape memory alloy wire and a second segment of shape memory alloy wire, wherein:

the second segment of shape memory alloy wire is configured to oppose the first segment of shape memory alloy wire;

the one or more shape memory alloy wires are configured to move the second part relative to the first part over a range of movement; and a tension of the first and second segments of shape memory alloy wire is variable independently of the position of the second part over at least a portion of the range of movement;

the first segment of shape memory alloy wire is connected to the first part by a first resilient element at a first end and a second end of the first segment of shape memory alloy wire is connected to the second part; and the first resilient element is configured such that in response to a change in tension of the first segment of shape memory alloy wire, a first distance between the first segment of shape memory alloy wire and at least one of the heat sinks is increased or decreased by an amount greater than a change in a second distance between the first and second ends;

moving the first segment of shape memory alloy wire towards at least one of the heat sinks increases the cooling rate; and moving the first segment of shape memory alloy wire away from at least one of the heat sinks decreases the cooling rate.

8. The method according to claim 7, wherein the one or more shape memory alloy wires are configured to move at least one of the second part relative to the first part over the range of movement or the first part relative to the second part over the range of movement.

9. The method according to claim 8, wherein the second end of the first segment of shape memory alloy wire is connected to the second part by a second resilient element.

10. The method according to claim 7, further comprising:

determining, using a temperature sensing module, a temperature corresponding to the first segment of shape memory alloy wire; and adjusting a distance of the first segment of shape memory alloy wire from at least one of the heat sinks based on the temperature.

11. The method according to claim 10, further comprising:

in response to changing the relative positions of the second part and the first part, reducing the distance of the first segment of shape memory alloy wire from at least one of the heat sinks.

* * * * *